US011051213B2

(12) United States Patent
Zee et al.

(10) Patent No.: US 11,051,213 B2
(45) Date of Patent: Jun. 29, 2021

(54) CORE NETWORK NODE AND METHOD THEREIN FOR OBTAINING A DECISION OF A CN/RAN ENDPOINT PAIR FOR USER PLANE SESSION IN A RADIO COMMUNICATIONS NETWORK

(71) Applicant: Telefonaktiebolaget LM Ericsson (publ), Stockholm (SE)

(72) Inventors: Oscar Zee, Stockholm (SE); Ulf Eric Andretzky, Huddinge (SE); Dan Gren, Upplands Väsby (SE); Tomas Nylander, Värmdö (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 50 days.

(21) Appl. No.: 16/614,906

(22) PCT Filed: May 23, 2017

(86) PCT No.: PCT/SE2017/050544
§ 371 (c)(1),
(2) Date: Nov. 19, 2019

(87) PCT Pub. No.: WO2018/217142
PCT Pub. Date: Nov. 29, 2018

(65) Prior Publication Data
US 2020/0112889 A1 Apr. 9, 2020

(51) Int. Cl.
*H04W 36/00* (2009.01)
*H04W 76/12* (2018.01)
(Continued)

(52) U.S. Cl.
CPC ..... *H04W 36/0055* (2013.01); *H04L 41/5077* (2013.01); *H04W 36/08* (2013.01); *H04W 40/36* (2013.01); *H04W 76/12* (2018.02)

(58) Field of Classification Search
None
See application file for complete search history.

(56) References Cited

U.S. PATENT DOCUMENTS 6,577,862 B1 *   6/2003  Davidson ............. G10L 19/012
                                                370/433
2004/0042468 A1 * 3/2004  Kovacs ................. H04L 69/40
                                                370/401
(Continued)

FOREIGN PATENT DOCUMENTS

WO    2016134752 A1    9/2016
WO    2016192636 A1   12/2016
WO    2016192639 A1   12/2016

OTHER PUBLICATIONS

International Search Report and the Written Opinion of the International Searching Authority, issued in corresponding International Application No. PCT/SE2017/050544, dated Feb. 9, 2018, 10 pages.

*Primary Examiner* — Andrew C Oh
(74) *Attorney, Agent, or Firm* — Rothwell, Figg, Ernst & Manbeck, P.C.

(57) ABSTRACT

A method performed by a method performed by a core network node for obtaining a decision of a Core Network, CN/Radio Access Network, RAN, endpoint pair for a user plane session between a RAN and a CN in a radio communications network is provided. The RAN comprises multiple RAN transport endpoints, RAN endpoints, and the CN comprises multiple CN transport endpoints, CN endpoints. The core network node obtains (1101) identifiers of available CN endpoints in the CN, and obtains (1102) identifiers of available RAN endpoints in the RAN. The available CN endpoints and available RAN endpoints comprises a number of possible transport endpoint pairs between the RAN and the CN, CN/RAN endpoint pairs. The core network node (Continued)

further obtains (1103) characteristics of a respective transport path of the number of possible CN/RAN endpoint pairs. The core network node then obtains (1108) a decision of a CN/RAN endpoint pair out of the number of possible CN/RAN endpoint pairs, based on the obtained characteristics of the respective transport path of the number of possible CN/RAN endpoint pairs. The CN/RAN endpoint pair is selected for the user plane session between the RAN and the CN in the radio communications network.

11 Claims, 17 Drawing Sheets

(51) Int. Cl.
*H04L 12/24* (2006.01)
*H04W 36/08* (2009.01)
*H04W 40/36* (2009.01)

(56) References Cited

U.S. PATENT DOCUMENTS

| | | | | |
|---|---|---|---|---|
| 2004/0203640 A1* | 10/2004 | Molander | ............. | H04W 76/12 455/414.1 |
| 2006/0133352 A1* | 6/2006 | Chang | ................. | H04L 65/1069 370/352 |
| 2008/0184032 A1* | 7/2008 | Li | ..................... | H04W 12/0431 713/171 |
| 2011/0269465 A1* | 11/2011 | Xu | .................... | H04W 36/0061 455/436 |
| 2012/0088505 A1* | 4/2012 | Toh | ...................... | H04W 8/186 455/434 |
| 2013/0084892 A1* | 4/2013 | Teyeb | .................. | H04W 48/16 455/456.6 |
| 2013/0150037 A1* | 6/2013 | Jha | ....................... | H04W 36/08 455/435.1 |
| 2013/0286821 A1* | 10/2013 | Liu | ...................... | H04W 48/17 370/225 |
| 2014/0219248 A1* | 8/2014 | Reddiboyana | ........ | H04W 76/15 370/331 |
| 2015/0023320 A1* | 1/2015 | Inakoshi | ............... | H04W 76/12 370/331 |
| 2015/0065130 A1* | 3/2015 | Inakoshi | ............... | H04W 8/065 455/435.2 |
| 2015/0156802 A1* | 6/2015 | Morioka | ......... | H04W 36/00835 370/328 |
| 2015/0257182 A1* | 9/2015 | Li | ......................... | H04W 48/18 370/329 |
| 2015/0341786 A1* | 11/2015 | Wang | .................... | H04W 56/00 455/411 |
| 2015/0373699 A1* | 12/2015 | Xu | ....................... | H04W 80/045 370/329 |
| 2016/0050585 A1* | 2/2016 | Shan | ....................... | H04W 4/70 370/235 |
| 2016/0174193 A1* | 6/2016 | Zhang | .................... | H04W 4/06 370/312 |
| 2016/0174285 A1* | 6/2016 | Ke | ......................... | H04W 36/08 370/329 |
| 2017/0142560 A1* | 5/2017 | Ryu | ...................... | H04W 68/025 |
| 2017/0195926 A1* | 7/2017 | Iwai | ...................... | H04W 36/12 |
| 2017/0208634 A1* | 7/2017 | Bharatia | ............... | H04W 76/11 |
| 2018/0070331 A1* | 3/2018 | Byun | .................. | H04W 72/1273 |
| 2018/0084560 A1* | 3/2018 | Cho | .................. | H04W 52/0216 |
| 2018/0199288 A1* | 7/2018 | Cho | .................. | H04W 52/0229 |
| 2018/0241619 A1* | 8/2018 | Bedekar | ............. | H04L 41/0803 |
| 2018/0249372 A1* | 8/2018 | Mizukami | ............ | H04W 8/065 |
| 2018/0249479 A1* | 8/2018 | Cho | .................... | H04W 12/086 |
| 2018/0262465 A1* | 9/2018 | Maattanen | ........ | H04L 63/0209 |
| 2018/0270741 A1* | 9/2018 | Enomoto | ............. | H04W 36/12 |
| 2018/0288670 A1* | 10/2018 | Li | ......................... | H04W 8/186 |
| 2018/0302877 A1* | 10/2018 | Bosch | .................. | H04W 76/10 |
| 2018/0317118 A1* | 11/2018 | Jung | ................. | H04W 28/0231 |
| 2018/0352416 A1* | 12/2018 | Ryu | ....................... | H04W 4/70 |
| 2019/0028887 A1* | 1/2019 | Ryu | ........................ | H04W 8/20 |
| 2019/0037629 A1* | 1/2019 | Ryu | ........................ | H04W 8/08 |
| 2019/0045351 A1* | 2/2019 | Zee | ......................... | H04W 48/18 |
| 2019/0208555 A1* | 7/2019 | Zee | ......................... | H04W 76/15 |
| 2020/0112889 A1* | 4/2020 | Zee | ......................... | H04W 40/36 |
| 2020/0275356 A1* | 8/2020 | Forsman | ............ | H04L 41/0803 |

* cited by examiner

CORE NETWORK NODE AND METHOD THEREIN FOR OBTAINING A DECISION OF A CN/RAN ENDPOINT PAIR FOR USER PLANE SESSION IN A RADIO COMMUNICATIONS NETWORK

CROSS REFERENCE TO RELATED APPLICATION(S)

This application is a 35 U.S.C. § 371 National Phase Entry Application from PCT/SE2017/050544, filed May 23, 2017, designating the United States, the disclosure of which is incorporated herein by reference in its entirety.

TECHNICAL FIELD

Embodiments herein relate to a core network node and methods therein. In particular, they relate to obtaining a decision of a Core Network/Radio Access Network, (CN)/(RAN) endpoint pair for a user plane session between a RAN and a CN in a radio communications network.

BACKGROUND

In a typical wireless communication network, wireless devices, also known as wireless communication devices, mobile stations, stations (STA) and/or user equipments (UE), communicate via a Radio Access Network (RAN) to one or more core networks (CN). The RAN covers a geographical area which is divided into service areas or cell areas, which may also be referred to as a beam or a beam group, with each service area or cell area being served by a radio network node such as a radio access node e.g., a WI-Fi access point or a radio base station (RBS), which in some networks may also be denoted, for example, a "NodeB" or "eNodeB". A service area or cell area is a geographical area where radio coverage is provided by the radio network node. The radio network node communicates over an air interface operating on radio frequencies with the wireless device within range of the radio network node.

A Universal Mobile Telecommunications System (UMTS) is a third generation (3G) telecommunication network, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipments. In a forum known as the Third Generation Partnership Project (3GPP), telecommunications suppliers propose and agree upon standards for third generation networks, and investigate enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. This type of connection is sometimes referred to as a backhaul connection. The RNCs and BSCs are typically connected to one or more core networks.

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs. In general, in E-UTRAN/LTE the functions of an RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

Multi-antenna techniques can significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.

As mentioned above, the 3GPP is currently working on standardization of the 5th generation of radio access system, which also is referred to as New Radio (NR). A Radio Control Function (RCF) is in this example included in a Radio Control Node (RCN). An evolved architecture for the RAN is foreseen, both for LTE Evolution and New Radio tracks of 5G. This includes a solution where radio base stations may be split into parts for radio control, packet processing, and Radio Nodes (RNs) with base-band processing and radio units 3GPP is currently working on standardization of Release 14 of the LTE concept. In FIG. 1, the LTE architecture including RAN nodes such as eNBs, Home eNBs (HeNBs), HeNB GateWay (GW) and evolved packet core nodes such as Mobility Management Entity (MME)/Serving Gateway (S-GW). FIG. 1 depicts logical interfaces such as an S1 interface connecting HeNBs/eNBs to the MME/S-GW and HeNBs to the HeNB GW, while an X2 interface is connecting peer eNBs/HeNBs, optionally via an X2 GW.

Network Slicing

Network slicing is about creating logically separated partitions of the network, addressing different business purposes. These network slices are logically separated to a degree that they can be regarded and managed as networks of their own.

This is a new concept that applies to both LTE Evolution and new 5G RAT also referred to as NextGen NR System. The key driver for introducing network slicing is business expansion, i.e. improving the cellular operator's ability to serve other industries, e.g., by offering connectivity services with different network characteristics such as e.g. performance, security, and robustness.

The current working assumption is that there will be one RAN infrastructure that will connect to several Evolved Packet Core (EPC) instances, one EPC instance per network slice. As the EPC functions are being virtualized, it is assumed that the operator shall instantiate a new Core Network (CN) when a new slice should be supported. This architecture is shown in FIG. 2. Slice 0 may for example be a Mobile Broadband slice and Slice 1 may for example be a Machine Type Communication network slice.

LTE Architecture Evolution

It is not yet specified by 3GPP how the LTE architecture should evolve to meet the challenges of 5G. However, in 3GPP TR 23.799, an outline of an initial high level architecture view for 5G (NextGen) system which is shown in FIG. 3 wherein NG2 is a reference point for the control plane between NextGen (R)AN and NextGen Core.

NG3 is a reference point for the user plane between NextGen (R)AN and NextGen Core.

NG1 is a reference point for the control plane between NextGen UE and NextGen Core.

NG6 is a reference point between the NextGen Core and the data network. Data network may be an operator external public or private data network or an intra-operator data network, e.g. for provision of IMS services. This reference point corresponds to SGi, which is the reference point between the Packet Data Network Gateway (PDN GW) and the packet data network, for 3GPP accesses.

It is assumed that the above NextGen reference points will be the evolved counterparts of the LTE interfaces and that any new RAT would be integrated with the LTE radio interface at RAN level in a similar fashion as the way LTE Dual Connectivity is defined.

S1 Control Plane/NG2

S1 Control Plane interface is defined between MME and eNB, and is described in 3GPP specs TS 36.300, TS 36.410, TS 36.411, TS 36.412 and TS 36.413. The control plane stack is shown in FIG. 4. In the bottom of the control plane stack lays a Physical Layer and above a data link layer. Above the data link layer is the transport network layer which is based on Internet Protocol (IP) transport, and on top of IP, an Stream Control Transmission Protocol (SCTP) layer is added for reliable transport of signaling messages.

S1 User Plane/NG3

The user plane protocol stack of S1 Interface User Plane for eNB-S-GW is shown in FIG. 5. For 5G, it is assumed that NG2 will have a similar protocol stack as in S1-AP. S1 The User Plane interface is defined between S-GW and eNB, and is described in 3GPP specs TS 36.300, TS 36.410, TS 36.411, TS 36.414 and TS 29.281.

In the bottom of the user plane stack lays a Physical Layer and above a data link layer. Above the data link layer is the transport network layer is based on IP transport, and on top of IP, User Datagram Protocol (UDP) and GPRS Tunneling Protocol User Plane (GTP-U) is added for tunneling of UE eRAB individual user data. RAB stands for Radio Access Bearer while eRAN (E-RAB) stands for e-UTRAN Radio Access Bearer. GPRS means General Packet Radio Service. The GTP-U Destination Port number value for the S1-U connection is 2152. For 5G, it is assumed that for NG3 interface will have a similar protocol stack as in S1-U.

For LTE, the EPS bearer service architecture from 3GPP TS 36.300 is shown in FIG. 6. between a UE and eNB in E-UTRAN, via S-GW and Packet Data Network (PDN) Gateway (P-GW) in EPC, and a Peer entity at the Internet. An EPS bearer which may comprise an E-RAB, is the level of granularity for bearer level Quality of server (QoS) control in the EPC/E-UTRAN. That is, Service Data Flows mapped to the same EPS bearer receive the same bearer level packet forwarding treatment, e.g. scheduling policy, queue management policy, rate shaping policy, RLC configuration, etc.

An E-RAB transports the packets of an EPS bearer between the UE and the EPC. When an E-RAB exists, there is a one-to-one mapping between this E-RAB and an EPS bearer. An S1 bearer transports the packets of an E-RAB between an eNodeB and a Serving GW, where a S1 bearer corresponds to a GTP-U tunnel.

For 5G, currently the following agreement has been settled according to 3GPP TR 23.799 V1.2.0.

A PDU Session is an association between the UE and a data network that provides a PDU connectivity service. The type of the association includes IP type, Ethernet type and non-IP type.

The User Plane format in NextGen on NG3 and between UP functions shall support per PDU Session tunneling, i.e. there is one tunnel per PDU Session between a pair of Network Functions (NFs) e.g. between a RAN node and a UP function in the CN and between two UP functions in the CN. All QoS classes of a session share the same outer IP header, but the encapsulation header may carry QoS markings.

The transport protocol for 5G in NG3 is not yet decided, but it can be assumed that this protocol should have similar characteristics as GTP-U.

Figure below shows the architecture difference between S1-U in LTE and NG3 in 5G.

FIG. 7 shows architectural differences between S1-U in LTE and NG3 in 5G. According to current standard and agreement within 3GPP, the source and destination transport (IP) addresses of the GTP-U tunnel will be decided first:

During setup of E-RAB in LTE

During setup of PDN session in 5G.

The difference as shown in FIG. 7 is that in LTE, within the PDN session, an S1 bearer will be established for each service data flow between RAN and CN, while in 5G, a single PDN bearer will be established for PDN session, and each service data flow will be transmitted as a QoS flow within the PDN bearer.

Currently, reconfiguration of S1-U is possible but it can only be initiated by MME used for load balancing of S-GW pool. An S-GW pool is a number of S-GW within the same CN for load sharing of S1-U connections towards RAN.

SUMMARY

It is an object of embodiments herein to provide an improved radio communications network.

According to a first aspect of embodiments herein, the object is achieved by a method performed by a core network node for obtaining a decision of a Core Network, CN/Radio Access Network, RAN, endpoint pair for a user plane session between a RAN and a CN in a radio communications network. The RAN comprises multiple RAN transport endpoints, RAN endpoints, and the CN comprises multiple CN transport endpoints, CN endpoints.

The core network node obtains identifiers of available CN endpoints in the CN, and obtains identifiers of available RAN endpoints in the RAN. The available CN endpoints and available RAN endpoints comprises a number of possible transport endpoint pairs between the RAN and the CN, CN/RAN endpoint pairs.

The core network node further obtains characteristics of a respective transport path of the number of possible CN/RAN endpoint pairs.

The core network node then obtains a decision of a CN/RAN endpoint pair out of the number of possible CN/RAN endpoint pairs, based on the obtained characteristics of the respective transport path of the number of possible CN/RAN endpoint pairs. The CN/RAN endpoint pair is selected for the user plane session between the RAN and the CN in the radio communications network.

According to a second aspect of embodiments herein, the object is achieved by a core network node arranged to obtain a decision of a Core Network, CN/Radio Access Network, RAN, transport endpoint pair for a user plane session between a RAN and a CN in a radio communications network. The RAN is arranged to comprise multiple RAN transport endpoints, RAN endpoints, and the CN comprises multiple CN transport endpoints, CN endpoints. The core network node being configured to:
- Obtain identifiers of available CN endpoints in the CN, and obtain identifiers of available RAN endpoints in the RAN. The available CN endpoints and available RAN endpoints are adapted to comprise a number of possible transport endpoint pairs between the RAN and the CN, CN/RAN endpoint pairs.
- Obtain characteristics of a respective transport path of the number of possible CN/RAN endpoint pairs.
- Obtain a decision of a CN/RAN endpoint pair out of the number of possible CN/RAN endpoint pairs, based on the obtained characteristics of the respective transport path of the number of possible CN/RAN endpoint pairs. The CN/RAN endpoint pair is selected to be used for the user plane session between the RAN and the CN in the radio communications network.

An advantage of embodiments herein is that the load of S-GW pools can be balanced.

A further advantage of embodiments herein is that the fulfillment of the QoS within the mobile NW domain can be optimized based on the characteristics of the available RAN/CN transport endpoint pairs and RAN internal characteristics.

A further advantage of embodiments herein is that the load of RAN endpoints and transport links can be balanced, it also enables possibility to maximize the number of data streams between RAN and CN while fulfilling the characteristics requirement of the streams.

BRIEF DESCRIPTION OF THE DRAWINGS

Examples of embodiments herein are described in more detail with reference to attached drawings in which.

DETAILED DESCRIPTION

As part of developing embodiments herein a problem will first be identified and discussed.

In both LTE and 5G, there will be a differentiation of QoS between the services in terms of e.g. bitrate, packet loss, delay etc. As the transport endpoints of the eRAB/PDN connection between CN and RAN is decided by CN and RAN respectively, if there are multiple endpoints on both RAN node and S-GW pool, where each path between these endpoint has different characteristics in terms of delay and bandwidth, there is a need for a selection mechanism. Currently 3GPP provides a mechanism for selecting a dedicated GW IP address during setup and handover of a bearer also referred to as flow for taking these characteristics into consideration for fulfillment of E-RAB/flow QoS. This differentiation of characteristics may also be applied to different network slices, where the service for each slice may have different characteristics requirements. However, this mechanism is not enough when there are multiple endpoints in both RAN and CN.

Figure 1:
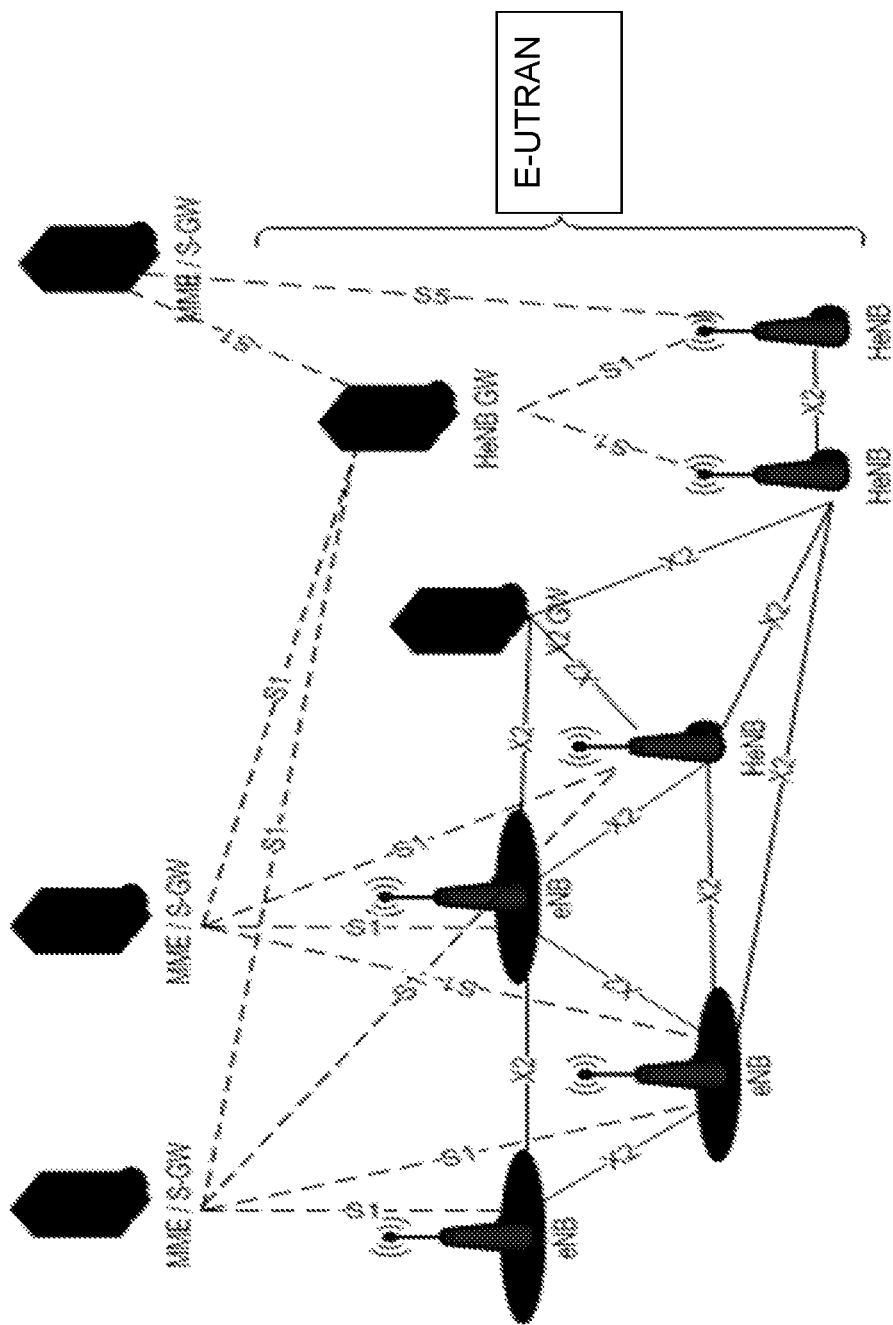
FIG. 1 is a schematic block diagram illustrating prior art.
Figure 2:
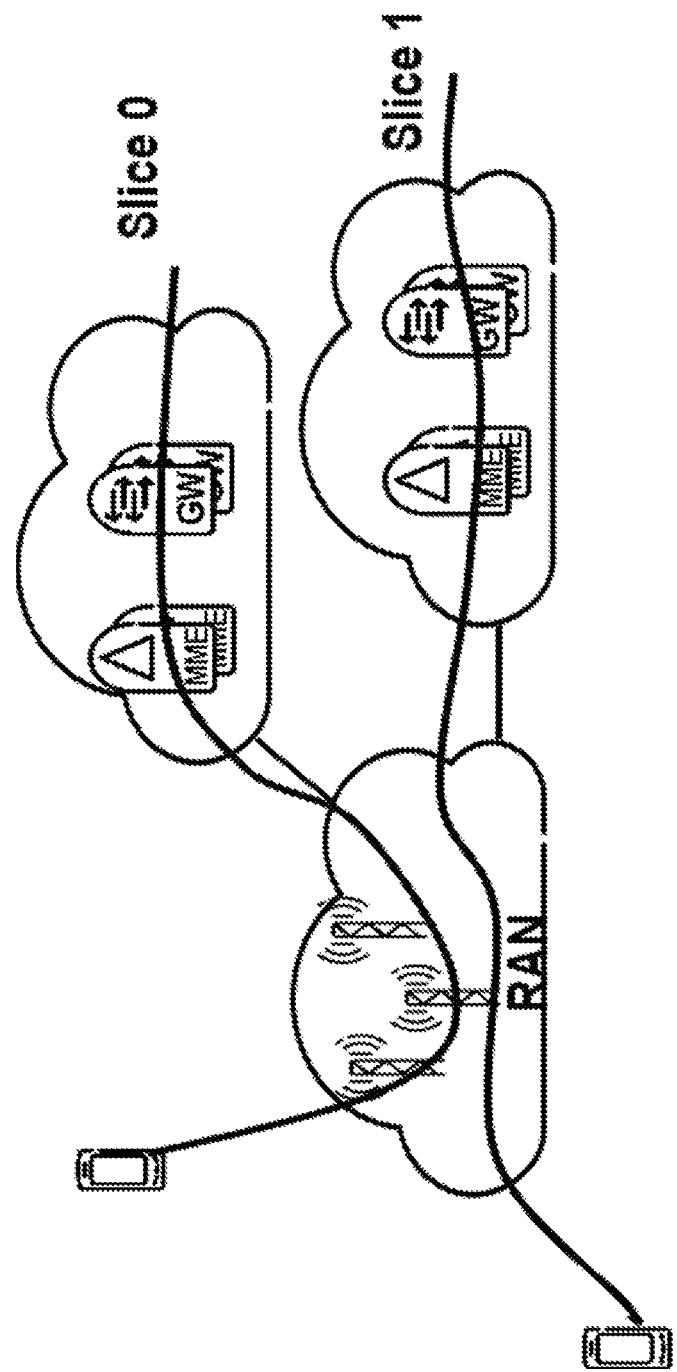
FIG. 2 is a schematic block diagram illustrating a prior art.
Figure 3:
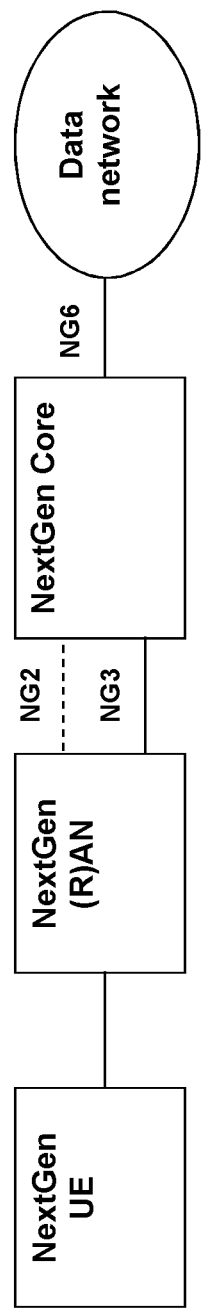
FIG. 3 is a schematic block diagram illustrating a prior art.
Figure 5:
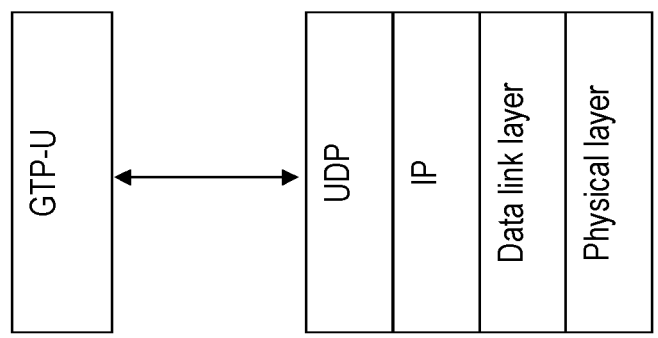
FIG. 5 is a schematic block diagram illustrating a prior art.
Figure 4:
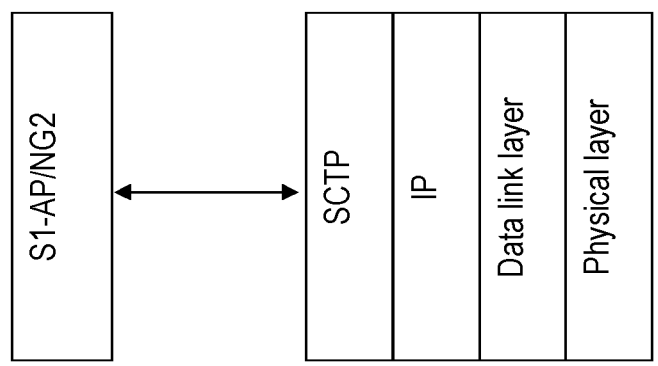
FIG. 4 is a schematic block diagram illustrating a prior art.
Figure 6:
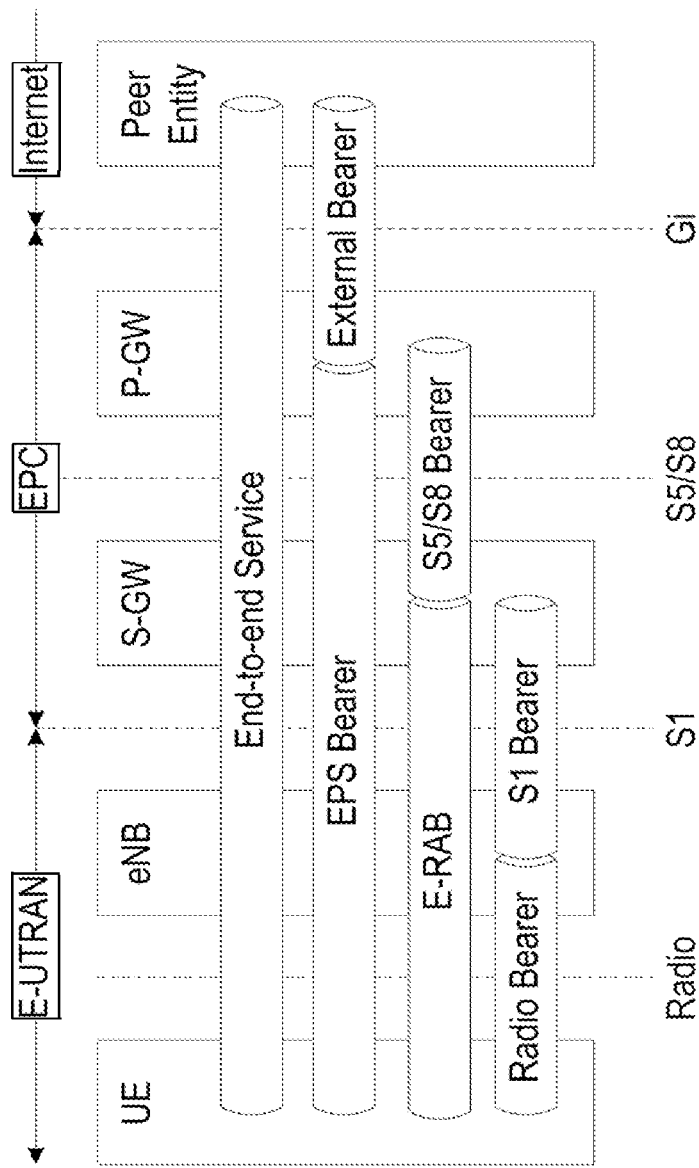
FIG. 6 is a schematic block diagram illustrating a prior art.
Figure 7:
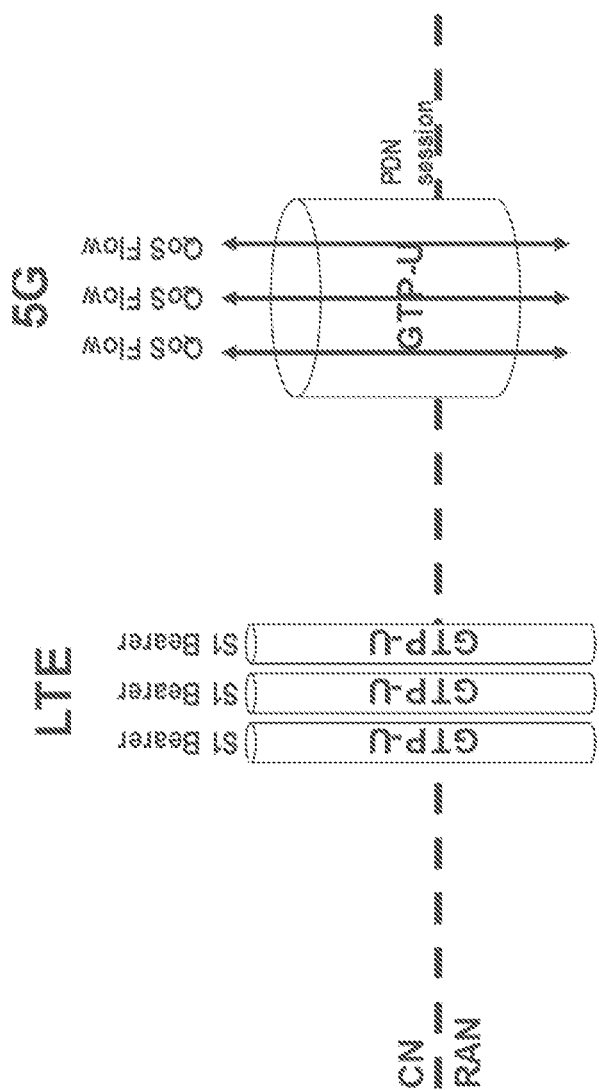
FIG. 7 is a schematic block diagram illustrating a prior art.
Figure 8:
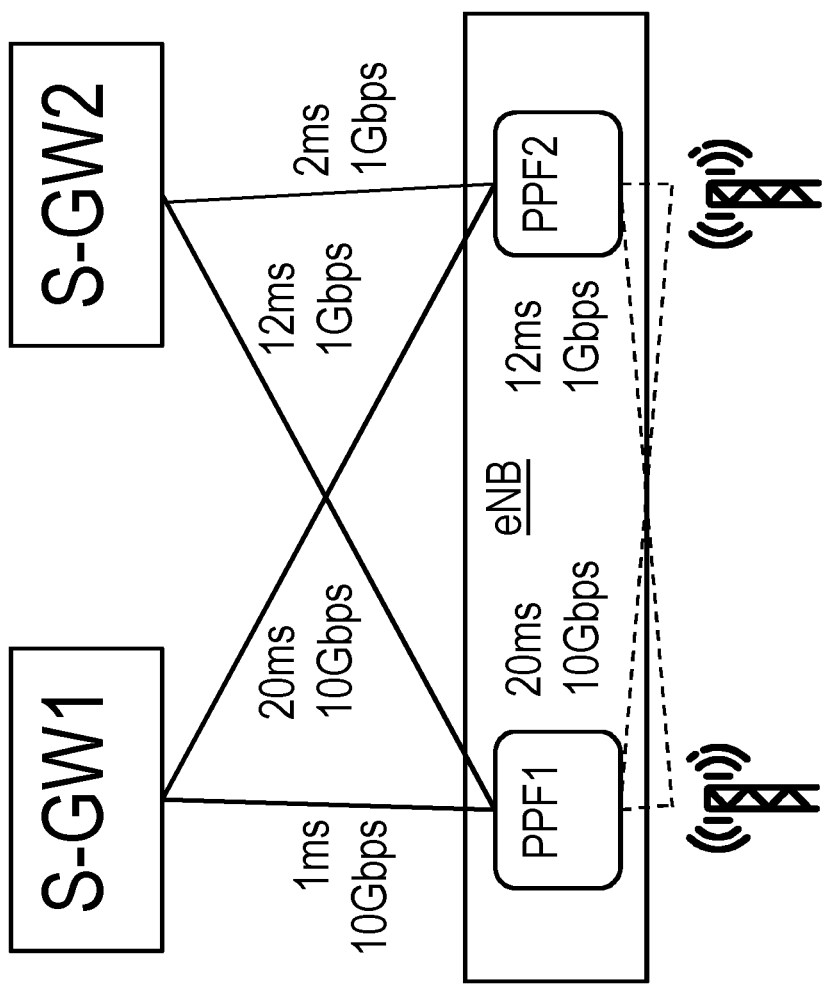
FIG. 8 is a schematic block diagram illustrating a prior art.
Figure 9:
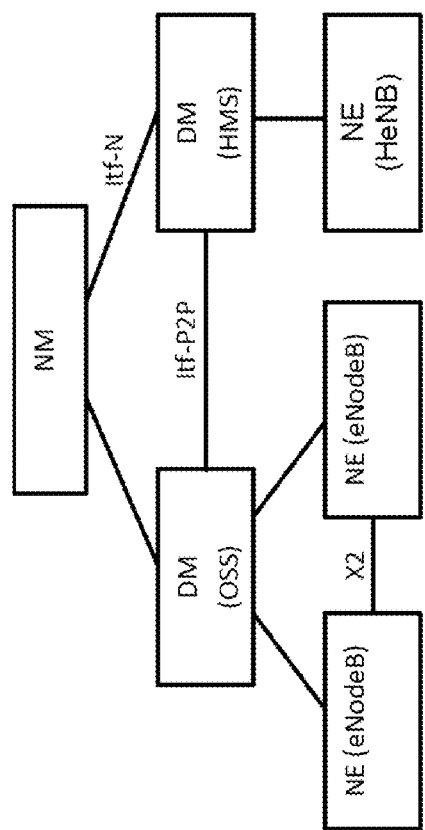
FIG. 9 is a schematic block diagram depicting embodiments of a network.

An example of multiple endpoints in both RAN and CN is illustrated in FIG. 8, an eNB is deployed with two individual transport endpoints located in different physical locations, terminated by a respective Packet Processing Functions (PPF) instances, PPF1 and PPF2. This eNB may thus be connected to two different Serving Gateways (S-GW) in different locations, and the link characteristics, e.g. max bitrate and latency, between the eNB endpoints and the two S-GWs would likely be different. FIG. 9 is also showing that the PPF1 and PPF2 are connected, by internal RAN functions and transport, to physical antenna systems.

To illustrate a concrete problem, the following scenario may be envisioned. In a split RAN architecture the eNB illustrated in FIG. 8 would have two Packet Processing Functions, PPF1 and PPF2, that may be virtualized and executed in different datacenters and similarly two service gateways (S-GW) that may be virtualized and executed in different datacenters. If it is assumed that the PPF1 and S-GW1 are executing in the same datacenter, and PPF2 and S-GW2 executed in another datacenter, since the bearer setup is initiated from the CN by selecting a S-GW, if then the CN selects S-GW1 for an S1-U transport endpoint for a certain session, it would be desirable to select PPF1 on this eNB to minimize latency and provide a good QoS by having the two endpoints in the same datacenter. Similarly, if a UE handover from one eNB to another eNB, a coordinated reselection of both PPF and S-GW would be desirable.

In US2011/0271002 A1 relates to initializing network streaming from one sending endpoint to one receiving endpoint. Solutions are described on path selection between two endpoints. This disclosure is directed to initializing a sending of a single data stream from a sending endpoint to a receiving endpoint. Both of the endpoints each have multiple physical interfaces connecting each endpoint to one or more networks. A first list is sent from a first one of the sending endpoint and the receiving endpoint to a second one of the sending endpoint and the receiving endpoint. The first list includes one or more groups of data communication channels at the first endpoint on which to send or receive data. A selection is then made by the second endpoint of one of the groups of data communication channels included in the first list, by comparing the groups in the first list with groups in a second list. The second list includes groups of data communication channels at the second endpoint on which to send or receive data.

In this document, the following problem are addressed:
Communication between two end points.
Multiple communication paths can be used between these two end points One single data stream between the endpoint is established, using multiple paths between these two end points, based on the requirement of characteristics of the data stream.

In US2011/0271002 A1 it doesn't handle any cases when there are multiple endpoints on receiving side/transmission side and selection of endpoint pairs which gives the optimal performance, which this application is describing.

Embodiments herein refer to an endpoint pair selection for a user plane session. In order to select an optimum path between the transport endpoints between CN and RAN, the following actions may be performed by a core network node according to some example embodiments herein:

1) Available transport endpoints on RAN and CN are identified.

It is preferred that the CN and the RAN are aware of which transport endpoints that are available on the remote side for a user plane interface, also known as S1-U for LTE and NG3 for 5G, in order to have a possibility to select RAN/CN endpoint pairs for the best characteristics for an upcoming session.

2) Characteristics of the CN/RAN endpoint pairs are determined.

When the available transport endpoints are known, e.g. CN and/or RAN determine the characteristics of the paths between the available transport endpoint pairs in order to be able to select the pair where the characteristics matches to a QoS requirement related to the upcoming session.

3) An endpoint pair is selected.

When both the available endpoints and the characteristics of the endpoint pairs are known, procedures for selection of the best endpoint pair, based on e.g. QoS, is performed.

It should be noted that the term "endpoint" when used herein means "transport endpoint" and the wordings "endpoint" and "transport endpoint" may be used interchangeably.

The overall principles of embodiments herein would work for both an LTE-like architecture and a new architecture based on an evolution of the S1 interface.

A management system wherein some embodiments herein may be implemented is shown in FIG. 9. The Node Elements (NE), also referred to as eNodeB, are managed by a Domain Manager (DM), also referred to as the operation and support system (OSS). A DM may further be managed by a Network Manager (NM). Two NEs are interfaced by X2, whereas the interface between two DMs is referred to as Interface (Itf)—Peer to Peer (P2P). The management system may configure the NEs, as well as receive observations associated to features in the network elements. For example, DM observes and configures NEs, while NM observes and configures DM, as well as NE via DM.

By means of configuration via the DM, NM and related interfaces, functions over the X2 and S1 interfaces may be carried out in a coordinated way throughout the RAN, eventually involving the Core Network, i.e. MME and S-GWs.

Figure 10:
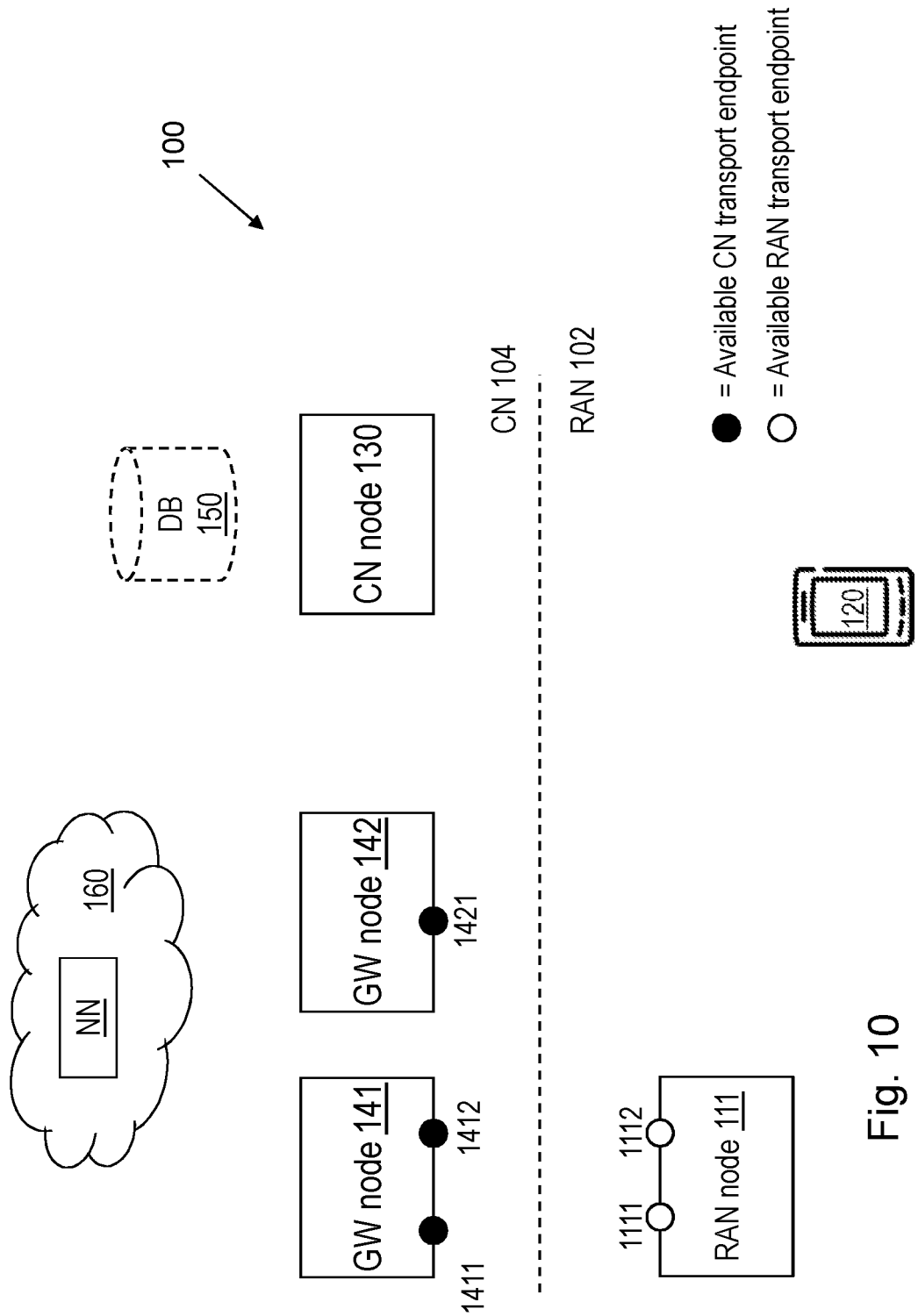
FIG. 10 is a schematic block diagram illustrating embodiments of a radio communications network.

Embodiments herein relate to radio communications networks in general. A radio communications network 100 as schematically illustrated in FIG. 10. For example, embodiments herein may be implemented in the radio communications network 100. The radio communications network 100 may be a cellular communications network. Further, the radio communications network 100 may be an LTE network, a 5G network, a WCDMA network, an GSM network, any 3GPP cellular network, Wimax, or any other radio communications network or system.

The wireless communication network 100 comprises one or more RANs, e.g. a RAN 102, and one or more CNs, e.g. a CN 104. The wireless communication network 100 may use a number of different technologies, such as LTE, LTE-Advanced, 5G, WCDMA, Global System for Mobile communications/enhanced Data rate for GSM Evolution (GSM/EDGE), WiMax, or UMB, just to mention a few possible implementations. Embodiments herein relate to recent technology trends that are of particular interest in a 5G context, however, embodiments are also applicable in further development of the existing wireless communication systems such as e.g. WCDMA and LTE.

One or more RAN nodes such as the RAN node 111, operate in the RAN 102 in the radio communications network 200. The RAN one or more RAN nodes such as the node 111 provide radio coverage over a geographical area, which may also be referred to as a cell, a cluster, a beam or a beam group, of a first Radio Access Technology (RAT), such as 5G, LTE, Wi-Fi or similar. The one or more RAN nodes such as the RAN node 111 may be a transmission and reception point e.g. a radio access network node such as a Wireless Local Area Network (WLAN) access point or an Access Point Station (AP STA), an access controller, a base station, e.g. a radio base station such as a NodeB, an evolved Node B (eNB, eNode B), a base transceiver station, a radio remote unit, an Access Point Base Station, a base station router, a transmission arrangement of a radio base station, a stand-alone access point or any other network unit capable of communicating with a wireless device within the service area served by the RAN node 111 depending e.g. on the first radio access technology and terminology used. The one or more RAN nodes such as the RAN 111 may be referred to as a serving radio network nodes and communicate with a wireless device 120 with Downlink (DL) transmissions to the wireless device 120 and Uplink (UL) transmissions from the wireless device 120. Other examples of the RAN 111 are Multi-Standard Radio (MSR) nodes such as MSR BS, network controllers, Radio Network Controllers (RNCs), Base Station Controllers (BSCs), relays, donor nodes controlling relay, Base Transceiver Stations (BTSs), Access Points (APs), transmission points, transmission nodes, Remote Radio Units (RRUs), Remote Radio Heads (RRHs), nodes in Distributed Antenna System (DAS) etc.

The RAN node 111 comprises two available RAN transport endpoints 1111, 1112 also referred to as RAN endpoints 1111, 1112. However, it should be noted that the RAN node 111 may comprise more than two RAN transport endpoints.

A core network node 130 may be configured to operating and/or comprised in the CN 104.

The core network node 130 may e.g. be a Mobility Management Entity (MME), or any other core network node.

Gateway nodes such as a first gateway node 141 and a second gateway node 142 may be operating and/or comprised in the CN 104. The first gateway node 141 and the second gateway node 142 are configured to operate in the radio communications network 100, e.g. in the CN 104.

The first gateway node 141 and second gateway node 142 may e.g. be a serving gateway node (S-GW) in an LTE network or a user plane gateway node in 5G network. The first gateway node 141 comprises two available CN transport endpoints 1411, 1412. The second gateway node 142 comprises one available CN transport endpoint 1421. Thus in FIG. 10, the CN 104 comprises three CN endpoints 1411, 1412, 142, also referred to as CN endpoints 1411, 1412,

1421. However, it should be noted that the CN 104 may comprise more than three CN endpoints and more than two gateway nodes.

In the wireless communication network 100, wireless devices e.g. a wireless device 120 such as a mobile station, a non-Access Point (non-AP) STA, a STA, a user equipment and/or a wireless terminals, communicate via one or more RANs such as the RAN 102, to one or more CNs such as the CN 104. Thus, the wireless device 120 is operating in the radio communications network 100.

It should be understood by the skilled in the art that "wireless device" is a non-limiting term which means any terminal, communications device, wireless communication terminal, user equipment, Machine-Type Communication (MTC) device, Device-to-Device (D2D) terminal, or node e.g. smart phone, laptop, mobile phone, sensor, relay, mobile tablets, an Internet-of-Things (IoT) device, e.g. a Cellular IoT (CIoT) device or even a small base station communicating within a service area.

In this disclosure the terms communications device, terminal, wireless device and UE are used interchangeably. Please note the term user equipment used in this document also covers other wireless devices such as Machine-to-Machine (M2M) devices, even though they do not have any user.

The wireless communication network 100 may further comprise a database 150. Identifiers of available CN endpoints 1411, 1412, 1421 and RAN endpoints 1111, 1112 may be stored in the database 150. The database 150 may be accessible both from RAN nodes such as the RAN node 111 and from CN nodes such as the core network node 130, and the gateway node 141 and 142.

Some actions in methods herein are performed by the core network node 130. As an alternative, any distributed Network Node (NN) and functionality, e.g. comprised in a cloud 160 may be used for performing these actions.

According to an example scenario in some embodiments herein, the following may be comprised:

A RAN node such as the RAN node 111 may comprise multiple endpoints such as RAN endpoints 1111 and 1112.

A CN such as the CN 104 may comprise one or multiple endpoints such as CN endpoints 1411, 1412, and 1421.

Between each RAN/CN endpoint pairs such as 1111-1411, 1111-1412, 1111-1421, 1112-1411, 1112-1412, 1112-1421 in FIG. 10, also referred to as path, there is a channel with certain characteristics, such as e.g. delay and total Bandwidth (BW).

E.g. a UE such as the wireless device 120 requires a session to be set up for incoming data communication or outgoing data communication. Therefore, a number of data streams needs to be established between the RAN node and the CN to be used for the required session, with certain characteristics requirements such as e.g. max delay and bandwidth.

For each data stream, one RAN-CN transport endpoint pair (=path) is selected in order to fulfill the data stream characteristics requirement, and maximize the number of data streams between RAN node and CN fulfilling the characteristics requirement of the streams.

Figure 11:
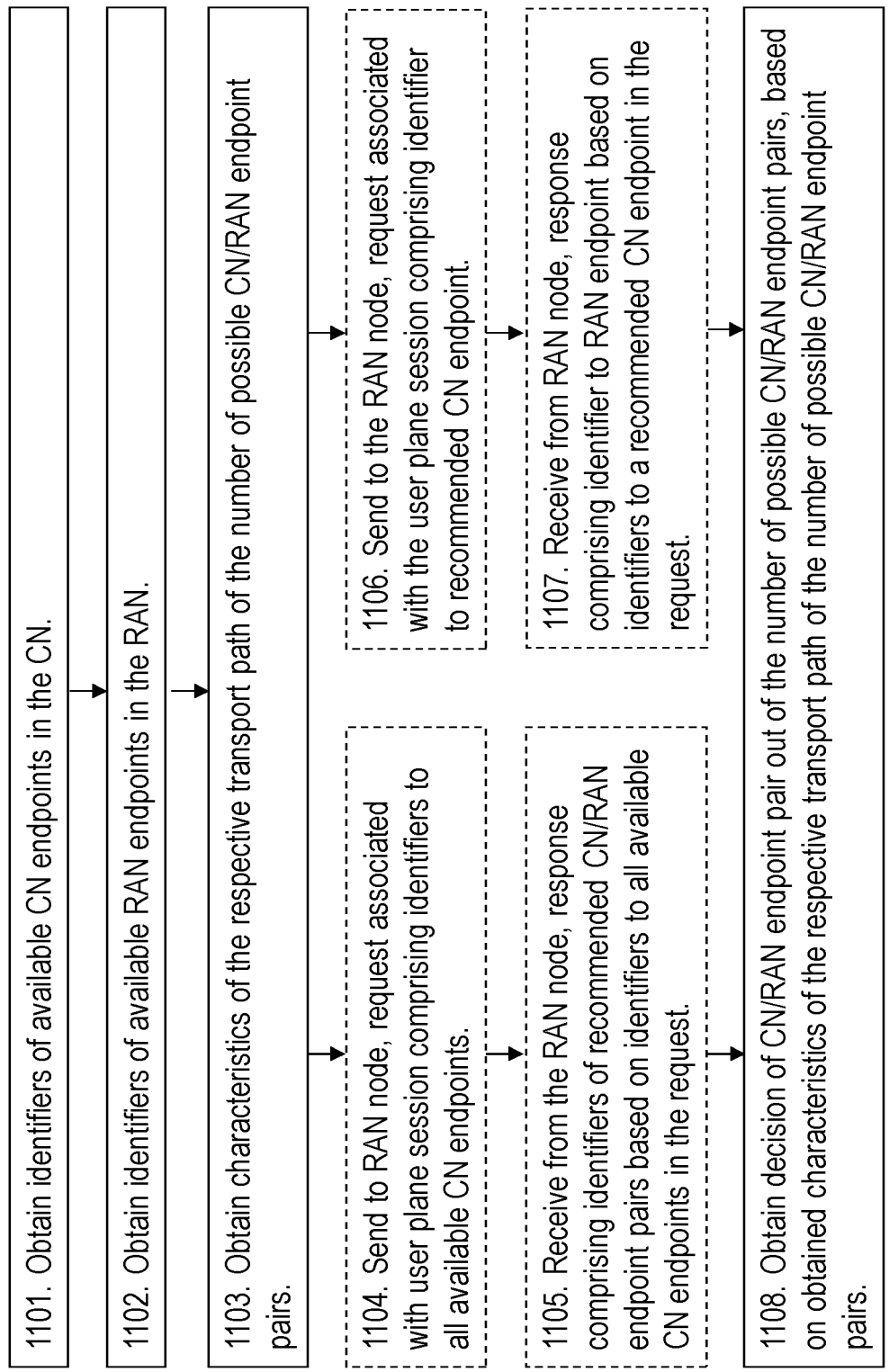
FIG. 11 is a flowchart depicting embodiments of a method in a core network node.

Example embodiments of a method performed by the core network node 130 for obtaining a decision of a CN/RAN endpoint pair for a user plane session between a RAN 102 and a CN 104 in a radio communications network 100 will now be described with reference to a flowchart depicted in FIG. 11. The method will first be described in a view seen from the core network node 130 together with FIG. 11, followed more detailed explanations and examples.

As mentioned above, the RAN 102 comprises multiple RAN transport endpoints, RAN endpoints, 1111, 1112, and the CN 104 comprises multiple CN transport endpoints, CN endpoints, 1411, 1412, 1421. The available CN endpoints 1411, 1412, 1421 may be comprised in one or more gateways 141, 142, such as e.g. serving gateways and/or user plane gateways operating in the CN 104. The available RAN endpoints 1111, 1112 may be comprised in one or more RAN nodes 111 operating in the RAN 102.

The method comprises the following actions, which actions may be taken in any suitable order. Actions that are optional are presented in dashed boxes in FIG. 11.

Action 1101

To be able to obtain a suitable RAN/CN endpoint pair according to embodiments herein, available transport endpoints on the RAN 102 and the CN 104 shall first be identified. It is preferred that the CN and the RAN are aware of which transport endpoints that are available on the remote side for a user plane interface, also known as S1-U for LTE and NG3 for 5G, in order to have a possibility to select RAN/CN endpoint pairs for the best characteristics for an upcoming session. Thus the core network node 130 obtains identifiers of available CN endpoints 1411, 1412, 1421 in the CN 104. According to the example shown in FIG. 10, the CN 104 comprises three CN endpoints 1411, 1412, 1421. In this example the core network node 130 obtains three identifiers of available CN endpoints 1411, 1412, 1421. Examples of type of identifiers may e.g. be a transport layer address according to 3GPP 36.413, an IP address for the endpoint, a new identifier created for this purpose.

Action 1102

The core network node 130 further obtain identifiers of available RAN endpoints 1111, 1112 in the RAN 102. According to the example shown in FIG. 10, the RAN 102 comprises two RAN endpoints 1111, 1112. In this example the core network node 130 obtains two identifiers of available RAN endpoints 1111, 1112. Examples of type of identifiers may e.g. be a transport layer address according to 3GPP 36.413, an IP address for the endpoint, a new identifier created for this purpose.

The available CN endpoints 1411, 1412, 1421 and available RAN endpoints 1111, 1112 comprises a number of possible transport endpoint pairs between the RAN 102 and the CN 104, referred to as CN/RAN endpoint pairs.

According to the example shown in FIG. 10, the available RAN/CN endpoint pairs are six:

RAN endpoint 1111-CN endpoint 1411,
RAN endpoint 1111-CN endpoint 1412,
RAN endpoint 1111-CN endpoint 1421,
RAN endpoint 1112-CN endpoint 1411,
RAN endpoint 1112-CN endpoint 1412, and
RAN endpoint 1112-CN endpoint 1421

The identifiers of the available CN endpoints 1411, 1412, 1421 and RAN endpoints 1111, 1112, may be obtained in any one or more out of a static configuration wherein the identifiers are already accessible, and an autonomous configuration wherein the identifiers are exchanged at session set up.

In the static configuration the identifiers are already accessible. In these embodiments, the identifiers of the available CN endpoints 1411, 1412, 1421 and RAN endpoints 1111, 1112 may be distributed during initialization of CN nodes 141, 142, and RAN nodes, and/or directly after changes has been done on the available CN endpoints 1411, 1412, 1421 and RAN endpoints 1111, 1112. In these embodiments the identifiers may be obtained in any one or more out of a centralized configuration wherein the identifiers are centralized available in a database 150, and a distributed configuration wherein the identifiers are locally available. In the embodiments of the centralized configuration, the identifiers of the available CN endpoints 1411, 1412, 1421 and RAN endpoints 1111, 1112 may be stored in a database 150 accessible both from RAN nodes such as the RAN node 111, and from CN nodes including the core network node 130. In the embodiments of the a distributed configuration, the available CN endpoints 1411, 1412, 1421 and RAN endpoints 1111, 1112 may be dynamically distributed between CN nodes including the core network node 130 and RAN nodes related to each other. CN nodes and RAN nodes being related to each other means those CN nodes and RAN nodes that an MME can connect together with an S1-U interface.

In the autonomous configuration the identifiers are exchanged at service data flow set up. In these embodiments, the identifiers of the available CN endpoints 1411, 1412, 1421 and RAN endpoints 1111, 1112 are distributed first when a user plane tunnel is needed to be setup or modified for the user plane session between the decided CN/RAN endpoint pair. A user plane tunnel corresponds to service data flow, or part of service data flow as defined in the background.

The obtaining of the identifiers of the available CN endpoints 1411, 1412, 1421 and RAN endpoints 1111, 1112 according to the static configuration and the autonomous configuration will be described more in detail below.

Action 1103

In order to obtain a decision of a suitable e.g. the most suitable RAN/CN endpoint pair according to embodiments herein, the decision shall be based on characteristics of the respective transport path of the possible CN/RAN endpoint pairs. Thus the core network node 130 obtains characteristics of the respective transport path of the number of possible CN/RAN endpoint pairs. Examples of type of characteristics may be latency between endpoints, bandwidth between endpoints, transmission cost between endpoints, areaId the endpoint belongs to (areaId)+transmission cost between areaIds.

The characteristics of the respective transport path of the number of possible CN/RAN endpoint pairs, may e.g. obtained in any one out of: a static configuration and an autonomous configuration.

In the static configuration, the characteristics may be stored in the data base 150 when a new available CN endpoint 1411, 1412, 1421 and/or RAN endpoint 1111, 1112 is introduced.

In the autonomous configuration, the characteristics may be obtained by (a) obtaining measurements of the respective transport path of the number of possible CN/RAN endpoint pairs, and/or (b) matching identities related to the characteristics of the respective available CN endpoints 1411, 1412, 1421 and/or RAN endpoints 1111, 1112.

The obtaining of the characteristics according to the static configuration and the autonomous configuration will be described more in detail below.

Action 1104

According to some embodiments the obtaining of a decision of a CN/RAN endpoint pair in Action 1008 below may be based on a negotiation with the RAN 102, performed in Actions 1104 and 1105, e.g. managed by the core network node 130. The core network node 130 may send a request associated with the user plane session to the RAN node 111 comprising the RAN endpoints 1111, 1112. In these embodiments, the request comprises identifiers to all available CN endpoints 1411, 1412, 1421 for the user plane session between the RAN 102 and the CN 104. According to the example shown in FIG. 10, the request comprises three identifiers of the available CN endpoints 1411, 1412, and 1421.

Action 1105

In these embodiments, wherein the request comprises identifiers to all available CN endpoints 1411, 1412, 1421, the core network node 130 may receive a response to the sent request, from the RAN node 111. The response comprises identifiers of one or more recommended CN/RAN endpoint pairs based on the identifiers to all available CN endpoints 1411, 1412, 1421 in the sent request. According to the example shown in FIG. 10, the RAN node 111 checks the three identified available CN endpoints 1411, 1412 and 1421, and its two RAN endpoints 1111 and 1112 making up the six possible CN/RAN endpoint pairs and considers their respective transport path characteristics. The RAN node 111 may further check the required quality for the transport path for the upcoming the user plane session between the RAN 102 and the CN 104 in the radio communications network 100.

Action 1106

According to some alternative embodiments the obtaining of a decision of a CN/RAN endpoint pair in Action 1008 below may be based on an alternative negotiation with the RAN 102, performed in Actions 1006 and 1007, e.g. managed by the core network node 130.

The core network node 130 may send a request associated with the user plane session to the RAN node 111 comprising the RAN endpoints 1111, 1112. In these embodiments, the request comprises one or more identifiers to a recommended CN endpoint 1411, 1412, 1421, such as e.g. one the RAN endpoint 1111, 1112 for the user plane session between the RAN 102 and the CN 104.

According to the example shown in FIG. 10, the request may comprise an identifier of one recommended CN endpoint 1411.

Action 1107

In these embodiments, wherein the request comprises one or more identifiers to a recommended CN endpoint 1411, 1412, 1421, the core network node 130 receiving from the RAN node 111, a response to the sent request. The response comprises an identifier to a RAN endpoint 1111, 1112 based on the identifiers to a recommended CN endpoint 1411, 1412, 1421 in the sent request. According to the example shown in FIG. 10, the RAN node 111 checks the identifier recommended for CN endpoint 1411 and its two RAN endpoints 1111 and 1112 making up two possible CN/RAN endpoint pairs and considers their respective transport path characteristics. The RAN node 111 may further check required quality for transport path for the upcoming the user plane session between the RAN 102 and the CN 104 in the radio communications network 100. The RAN node 111 then selects one CN/RAN endpoint pair based on this information. The RAN node 111 sends and the core network node 130 then receives an identifier of a recommended CN/RAN endpoint pair from the RAN node 111 selected by the RAN node 111.

Action 1108

The core network node 130 obtains a decision of a CN/RAN endpoint pair out of the number of possible CN/RAN endpoint pairs, based on the obtained characteristics of the respective transport path of the number of possible CN/RAN endpoint pairs. The CN/RAN endpoint pair is selected for the user plane session between the RAN 102 and the CN 104 in the radio communications network 100.

In some embodiments, the decision of a CN/RAN endpoint pair is taken by the core network node 130. In these embodiments the obtaining of the decision of the CN/RAN endpoint pair comprises deciding the CN/RAN endpoint pair.

In some alternative embodiments, the decision of the CN/RAN endpoint pair may be based on a negotiation with the RAN 102 managed by the core network node 130 e.g. in Actions 1104 and 1105 above or in Actions 1106 and 1107 above. The decision may thus be managed by the core network node 130 and be obtained by receiving it from the RAN node 111 comprising the RAN endpoints 1111, 1112.

According to the embodiments of the method described in the above Actions, it is possible to fulfill the characteristics requirement of each data stream between the RAN node 111 and the CN 104 in the radio communications network 100 where a RAN node such as the RAN node 111 comprises multiple endpoints. It is also possible to maximize the number of data streams between RAN node 111 and CN 104 fulfilling the characteristics requirement of the streams.

Embodiments herein will now be further described and exemplified. The text below is applicable to and may be combined with any suitable embodiment described above.

Figure 11A:
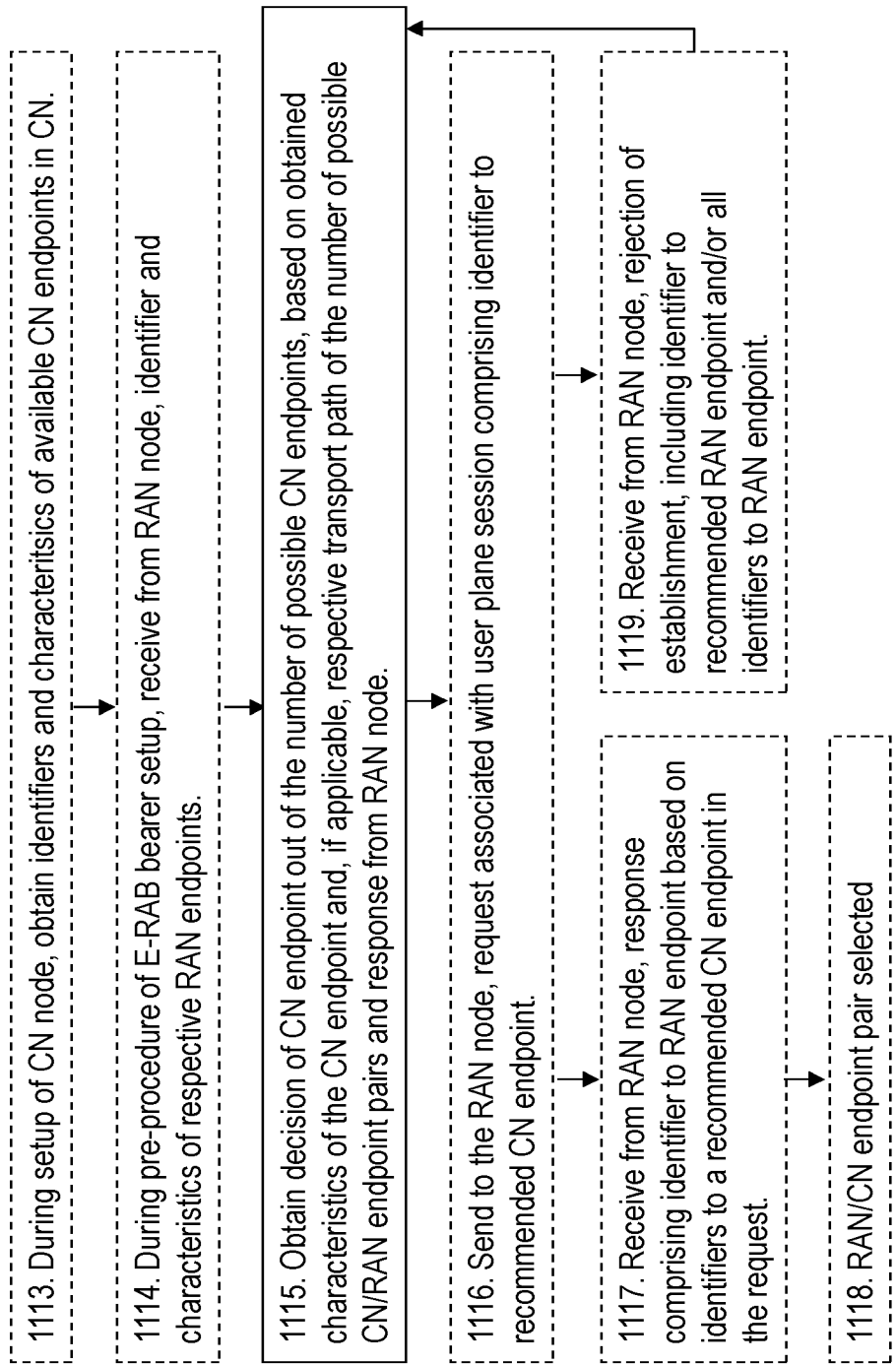

Three example embodiments of the method for obtaining a decision of a CN/RAN endpoint pair for a user plane session between the RAN 102 and the CN 104 in a radio communications network as 100 described above with reference to FIG. 11 will now be described with reference to a flowchart depicted in FIGS. 11a, b and c.

The method actions below depicted in FIG. 11a relate to Example 1 described below.

Action 1113

During setup of a CN node comprising the CN endpoints, 1411, 1412, 142, the core network node 130, obtains identifiers and characteristics of available CN endpoints 1411, 1412, 142 in the CN 104. This action is related to part of Actions 1101 and 1103.

Action 1114

During pre-procedure of E-RAB bearer setup, the core network node 130 optionally receives from the RAN node 111, the identifier and characteristics of the respective RAN endpoints 1111, 1112. This action is related to part of Action 1103.

Action 1115

The core network node 130 obtains decisions of a CN endpoint out of the number of possible CN endpoints 1411, 1412, 142, based on obtained characteristics of the available CN endpoints 1411, 1412, 142 in the CN 104 and if applicable, respective transport path of the number of possible CN/RAN endpoint pairs and response from RAN node 111. This action is related to part of Action 1108.

Action 1116

The core network node 130 sends to the RAN node 111, a request associated with the user plane session comprising identifier to recommended CN endpoint. This action is related to Action 1106.

Action 1117

The core network node 130 receives from the RAN node 111, a response comprising an identifier to a RAN endpoint based on the identifiers to the recommended CN endpoint in the request. This action is related to Action 1107.

Action 1118

The core network node 130 selects a RAN/CN endpoint pair This action is related to part of Action 1108.

Action 1119

The core network node 130 receives from the RAN node 111, a rejection of establishment, optionally including identifier to recommended RAN endpoint and/or all identifiers to RAN endpoint. pair This action is related to part of Action 1108.

Figure 11B:

The method actions below depicted in FIG. 11b relate to Example 2 described below. FIG. 11b reflects the setup procedure after Action 1108, i.e. when the endpoint pair selection decision has been done.

Action 1121

The core network node 130 may send to the RAN node 111, a request associated with the user plane session comprising identifiers to recommended CN endpoint and RAN endpoint.

Action 1122

The core network node 130 receives from RAN node 111, a response that the request sent in Action 1121 has been accepted.

Figure 11C:
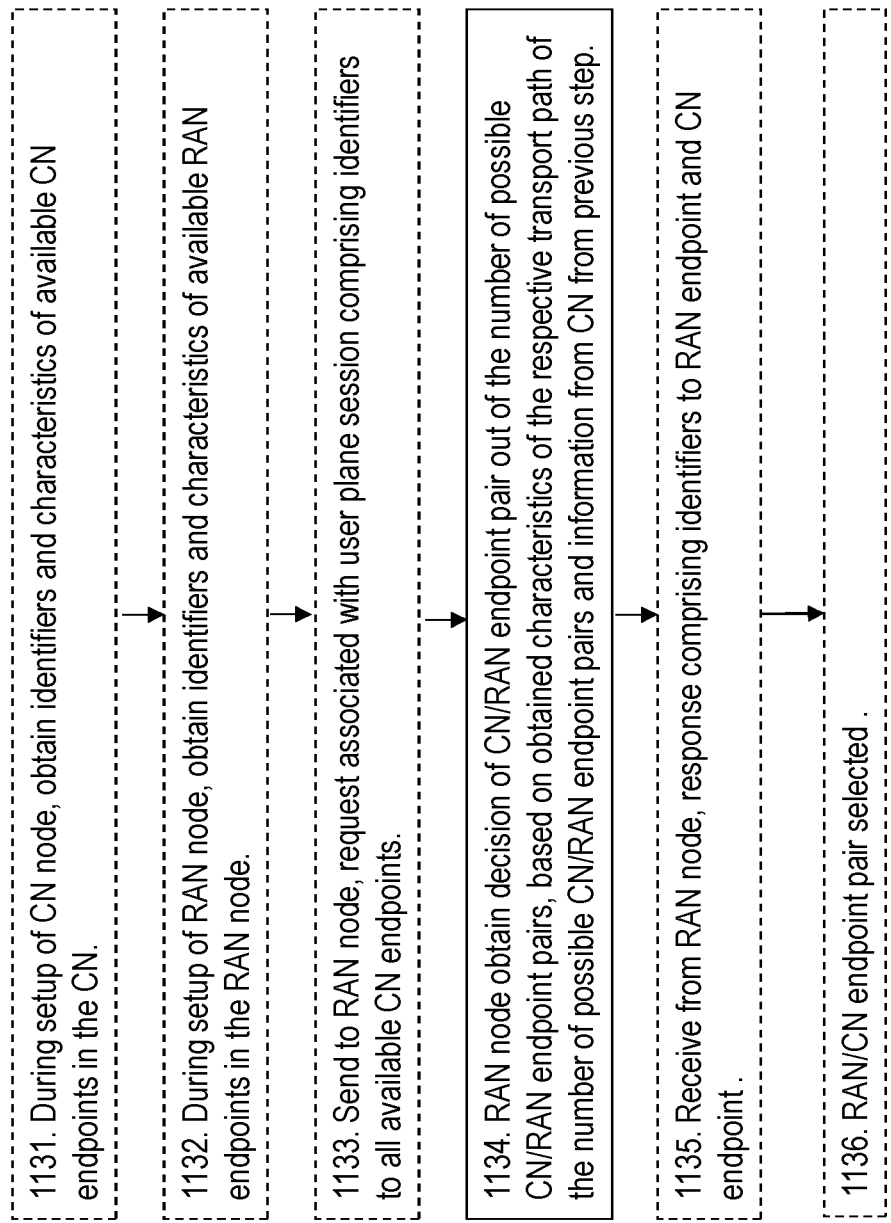

The method actions below depicted in FIG. 11c is a detailed example of the method described above together with FIG. 11.

Action 1131

During setup of a CN node, the core network node 130 obtains identifiers and characteristics of available CN endpoints 1411, 1412, 1421 in the CN 104. This action is related to part of Action 1101 and 1103.

Action 1132

During setup of the RAN node 1111, the core network node 130 obtains identifiers and characteristics of available RAN endpoints 1111, 1112 in the RAN node 111. This action is related to part of Action 1102 and 1103.

Action 1133

The core network node 130 sends to the RAN node 111, a request associated with user plane session comprising identifiers to all available CN endpoints 1411, 1412, 1421 in the CN 104. This action is related to part of Action 1104.

Action 1134

The RAN node 111 obtains a decision of CN/RAN endpoint pair out of the number of possible CN/RAN endpoint pairs, based on obtained characteristics of the respective transport path of the number of possible CN/RAN endpoint pairs and information from CN from the previous action. This action is related to part of Action 1108.

Action 1135

The core network node 130 obtains by receiving from the RAN node 111, a response comprising identifiers to the decided RAN endpoint and CN endpoint. This action is related to part of Action 1105.

Action 1136

The RAN/CN endpoint pair is then selected by the core network node 130 This action is related to part of Action 1108.

Figure 12:
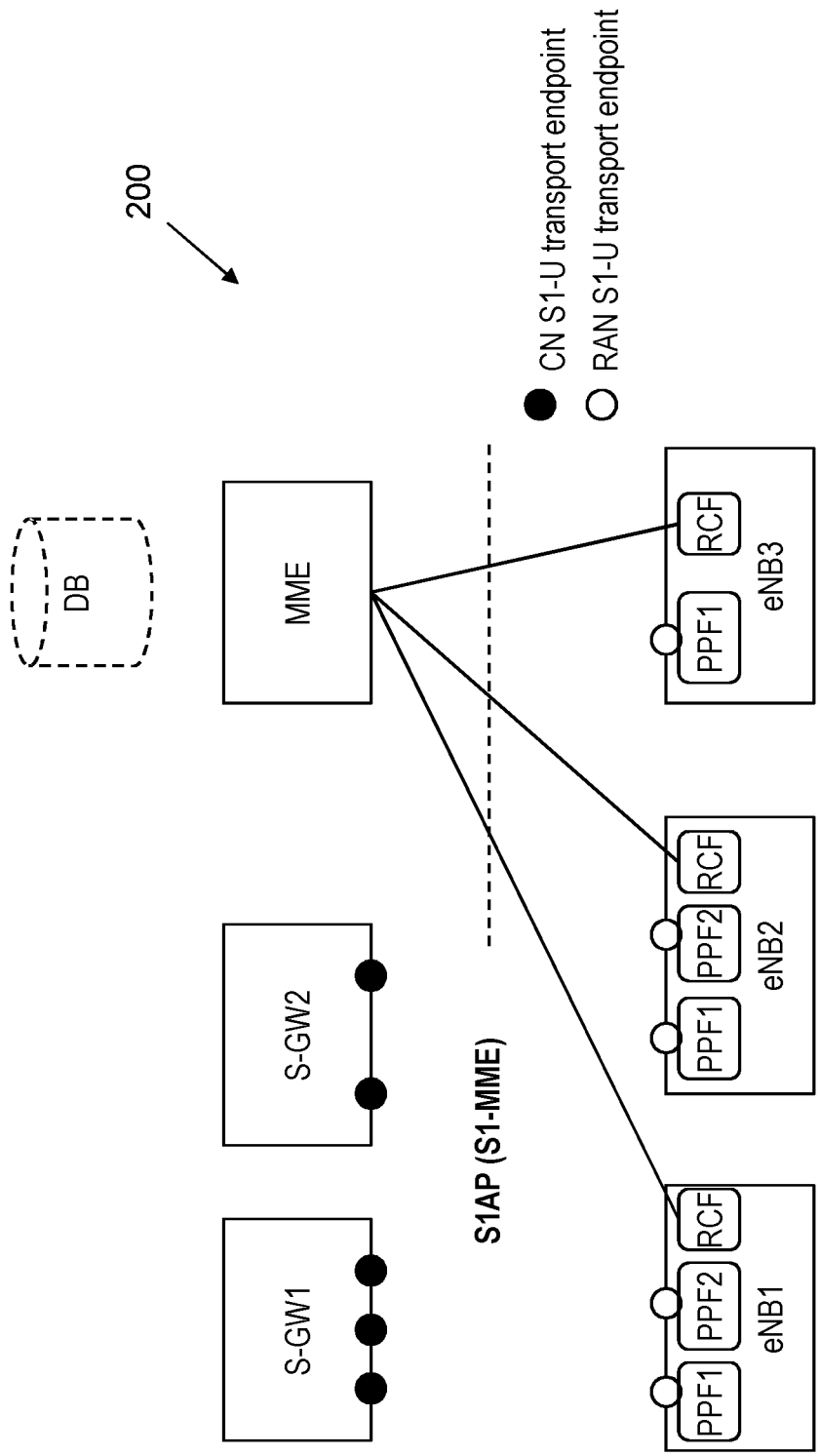
FIG. 12 is a schematic block diagram illustrating embodiments of a radio communications network.

In an example of embodiments herein the RAN 102 is represented by LTE and the CN 104 is represented by EPC and thus related to a LTE/EPC network 200 which is shown in FIG. 12. The first gateway node 141 is represented by a serving gateway referred to as S-GW 1 and the second gateway node 142 is represented by a serving gateway referred to as S-GW 2. Further, the network node 111 is represented by an eNB, referred to as eNB 1. The LTE network of FIG. 12 further comprises a second eNB referred to as eNB2 and a third eNB referred to as eNB3. Thus in this LTE/EPC network 200, there are two serving gateways, S-GW1, S-GW2, and three eNBs, eNB1, eNB2, eNB3. S-GW1 has three CN transport endpoints for user plane, and S-GW2 has two CN transport endpoints. The CN transport endpoints for user plane are referred to as filled circles in FIG. 12. Both eNB1 and eNB2 have two RAN transport endpoints, and eNB3 has only one endpoint. The RAN transport endpoints for user plane are referred to as filled circles in FIG. 12. The core network node 130 is represented by an MME in the example depicted in FIG. 12. The database 150 is referred to as DB in FIG. 12.

Between eNB1 and S-GW1, as there are three CN transport endpoints and two RAN endpoints, there will be six possible CN/RAN endpoint pairs for setting up a S1-U tunnel. An S1-U tunnel is the same as S1-bearer for the service data flow.

In current 3GPP standard, when a S1-U tunnel is setup between a CN and an eNB, the MME will first select a suitable CN endpoint in one of the S-GWs, and transmit the address to the eNB through S1AP, the eNB will then select a suitable RAN endpoint and response to the setup through S1AP.

In the example according to embodiments herein and in FIG. 12, there is also a database (DB) function, which will be used in some of the embodiments for storing CN transport endpoints and/or RAN transport endpoints, and the characteristics of the available and/or recommended and/or decided CN/RAN endpoint pairs. An RCF is in this example included in each of the three eNBs, eNB1, eNB2, eNB3.

Below, initially a brief description of all possible variants of the Actions mentioned above is provided, followed by a description of examples, using different embodiments of the Actions in the methods.

Identification and/or Obtaining of Available Transport Endpoints

This part is related to Actions 1101 and 1102 described above.

Static Configuration

In static configuration, the identifiers of the transport endpoints will be distributed during initialization of CN nodes and RAN nodes, and directly after changes has been done on the transport endpoints. For example, the identifiers of the respective CN transport endpoints 1411, 1412, 1421 may be distributed during initialization of CN nodes such as the respective Gateway nodes 141, 142. The identifiers of the RAN transport endpoints 1111, 112 may be distributed during initialization of RAN nodes such as the RAN node 111, and directly after changes has been done on the respective said transport endpoints.

The static configuration, may e.g. be performed in a centralized approach also referred to as a centralized configuration, and a distributed approach also referred to as a distributed configuration.

In the centralized approach, the available CN transport endpoints 1411, 1412, 1421 and available RAN transport endpoints 1111, 112 will be stored in a centralized node, e.g. in the database 150 also referred to as DB, which is accessible both from RAN nodes such as the RAN node 111 and the eNB1-3, and from CN nodes such as the core network node 130, the MME and the gateway nodes 141, 142, and the S-GW1, S-GW2. This centralized database may be collocated with other nodes such as the CN node 130, a DB node or any other node, and may of course be of distributed for scalability and redundancy reasons.

Each time a new endpoint is introduced or removed in CN user plane or eNB user plane, the endpoint information changes shall be registered to the centralized database. I.e. the RAN/CN nodes registers the new endpoint in the database for later discovery.

A CN user plane is used for establishing an S1 User plane on a GW node. An eNB user plane is used for establishing an S1 user plane on a RAN node.

Alternatively, for changes of available RAN endpoint 1111, 1112 in the RAN node 111 in LTE, the changes may be informed to the CN 104 through core network node 130 such as the MME by a new Information Element (IE) in an S1 Setup procedure and/or an eNB configuration update procedure and that the core network node 130 such as the MME updates the database 150 such as the DB. Likewise, for changes of an available transport endpoint in the gateway node 141, 142 such as e.g. S-GW, the changes may be informed through internal signaling within the CN 104, e.g. that the gateway node 141, 142 such as the S-GW updates the database 150 such as the DB. S1 Setup procedure is a procedure to exchange application level data needed for the eNB and the MME to correctly interoperate on the S1 interface. An eNB configuration update procedure is a procedure to update application level configuration data needed for the eNB and the MME to interoperate correctly on the S1 interface.

Yet another alternative is that the database 150 such as the DB is updated using other communication channels e.g. using O&M e.g. such as communication channels mentioned in FIG. 9, where both RAN (shown in the figure), CN (not shown in the figure), and the DB (not shown in the figure) are connected to NM (or DM) there.

The RAN nodes such as the RAN node 111 and the CN nodes such as the gateway nodes 141, 142 may then subscribe to modifications such as additions and deletions to the database 150 such as the DB and get informed when a new endpoint has appeared or disappeared. The information in the database 150 such as the DB may for example comprise endpoint address, e.g. IP address, area information where endpoint is located, total capacity of endpoint, etc.

In the distributed approach, the available CN transport endpoints such as the CN transport endpoints 1411, 1412 on the CN 104 and RAN transport endpoints such as the RAN endpoints 1111, 1112, on all the nodes on the RAN 102 will be distributed to remote nodes within the CN 104 such as to the core network node 130 e.g. MME, and within the RAN nodes such as the RAN node 111, e.g. an eNB.

For changes in any of the RAN endpoint 1111, 1112, in LTE, the changes may be informed to the CN 104 to the core network node 130 e.g. the MME by a new IE in the S1 Setup procedure and/or in an eNB configuration update procedure, or through other communication channels e.g. using O&M to the CN 104 as mentioned above.

For changes in a CN user plane endpoint, such as the CN transport endpoint 1411, 1412, 1421, in LTE, the changes may be informed to the RAN node 111 from the core network node 130 such as the MME by a new IE in S1 Setup procedure, an MME configuration update procedure, a new procedure in S1AP, e.g. S-GW configuration update procedure, or through other channels e.g. O&M as mentioned above, to the RAN node 111.

Automatic Determination

In automatic determination, the identifiers of the CN transport endpoints and the RAN transport endpoints will be distributed first when a user plane tunnel is needed to be setup or modified e.g. for the user plane session between the RAN 102 and the CN 104 in the radio communications network 100 as mentioned above.

In LTE, for each E-RAB setup, E-RAB modify, Initial context setup, handover request procedure between RAN node 111 such as the eNB and the core network node 130 such as the MME, the RAN node 111 and the core network node 130 will provide its transport endpoint(s) identifiers, also referred to as information to the remote side, the RAN node 111 and the core network node 130 may store this remote transport endpoint(s) information if needed. The transport endpoint information may for example besides the address also comprise information about where the end point is located.

Characteristics Determination and/or Obtaining of the CN/RAN Endpoint Pairs

This part is related to Action 1103 described above.

Static Configuration

When a new available RAN endpoint 1111, 1112, or CN endpoint 1411, 1412, 1421 is introduced, the characteristics value, e.g. "path delay" and "path bandwidth" between the new CN/RAN endpoint pairs between the new endpoint and the existing remote endpoints may be set manually, and these values may be stored in the database 150 or in the core network node 130 such as the MME, and eventually in the RAN node 111 for the endpoint pair selection and/or decision Action.

The distribution of this static configuration may be performed through the RAN<->CN control interface e.g. in LTE, during a eNB/MME configuration update procedure in S1AP, or outbound through e.g. O&M interface.

Autonomous Determination

In autonomous determination, the characteristics of the endpoint pairs may be determined and/or obtained by the RAN node 111 and/or CN node such as the gateway nodes 141, 142 e.g. by measurements and/or Identity matching.

Obtaining the characteristics by measurements, may be performed by like Round Trip Time (RTT) measurement by using IP ping or other test tools, and for bandwidth measurement by e.g. continuously or periodically running a Two-way Active Measurement Protocol (TWAMP) tests.

Obtaining the characteristics by identity matching, e.g. each datacenter has assigned with a unique identifier or an Area Identifier (AreaId). A data center here refers to a facility in a physical location composed of networked computers and storage that businesses or other organizations use to organize, process, store and disseminate large amounts of data. When each available RAN endpoint 1111, 1112, or CN endpoint 1411, 1412, 1421 is created in a datacenter, a datacenter identifier is known by the available RAN endpoint 1111, 1112, or CN endpoint 1411, 1412, 1421 in the RAN node 111 and/or gateway node 141, 142. An endpoint pair with the same datacenter identifier is recognized having shorter delay than pair with different datacenter identifiers. In case of using measurement, the results may be stored in the database 150 or in the core network node 130 such as in the MME, and eventually in the RAN node 111 for the endpoint pair selection Action.

The distribution of the determination results may be performed with the following example methods:

(a) Continuously through the RAN<->CN control interface e.g. in LTE eNB/MME configuration update procedure in S1AP may be used.

(b) Continuously through outbound such as O&M interface, (c) During runtime when the RAN<->CN user plane needs to be setup through RAN<->CN control signaling, e.g. in LTE during E-RAB setup, E-RAB modify, Initial context setup, and/or handover request procedure in S1AP.

Obtaining Endpoint CN/RAN Pair Selection and/or Decision

This part is related to Actions 1104 to 1108 described above.

Decided by CN

In this case, the core network node 130 will obtain the CN/RAN endpoint pair decision by performing the decision itself of which CN/RAN endpoint pair that should be used for the upcoming user plane session also referred to as the S1 bearer/PDN session between the RAN 102 and the CN 104. The decision may be performed by gathering the characteristics for all the endpoint pairs, and select an endpoint pair that can fulfill the QoS requirement for the E-RAB.

For LTE, this means during any one or more out of an E-RAB setup request, an E-RAB modify request, an Initial context setup request, a handover request, for each "E-RAB to Be Setup Item IE", transport layer address for both the CN 104 and the RAN 102 would preferably be present instead of only transport layer address for the CN 102. In the prior art, only transport layer address for CN is presented in the request message from the S1AP procedures mentioned above, i.e. E-RAB setup request, E-RAB modify request sent from CN to RAN. According to embodiments herein, the CN 104 shall also provide RAN transport layer address, =the RAN endpoint, in the request message to inform RAN which RAN endpoint to be used see Action 1108.

Decided by Negotiation Between CN and RAN

In this case, the core network node 130 And the RAN node 111 will together decide which endpoints should be used for the upcoming user plane session also referred to as S1 bearer/PDN session, and then send information such as an identifier about the decided CN/RAN end point to the core network node 130 which thereby obtains it. The negotiation may be divided into the following sub-actions (a)-(c), using LTE as example:

(a) In any one or more message out of an E-RAB setup request, an E-RAB modify request, an initial context setup request, and a handover request, the CN 104 e.g. by means of the core network node 130, will provide to the RAN node 111:

According to a first embodiment, identifiers such as e.g. addresses to all available CN endpoint addresses 1411, 1412, 1421. The first embodiment is related to Actions 1104 and 1105 described above and to the embodiment depicted in FIG. 11*c*.

According to a second embodiment, an identifier such as e.g. address to a recommended CN transport endpoint 1411, 1412, or 1421 for each EPS bearer for the upcoming user plane session, also referred to as E-RAB to Be Setup Item IE. A E-RAB to Be Setup Item IE is as an example be found in 3GPP TS 36.413 chapter 9.1.3.1. The second embodiment is related to Actions 1106 and 1107 described above in FIG. 11 and to the embodiment depicted in FIG. 11*a*.

(b) In any one or more message out of an E-RAB setup response, an E-RAB modify response, an initial context setup response, and a handover request acknowledge, for each E-RAB, the RAN node 111 will provide to the core network node 130:

According to the first embodiment wherein all available CN endpoints 1411, 1412, 1421 are received from the core network node 130, the RAN node 111 will provide identifiers of CN endpoint and RAN endpoint for a recommended CN/RAN endpoint pair.

According to the second embodiment, wherein an identifier such as an address of a recommended CN endpoint 1411, 1412, or 1421 is received from the core network node 130, the RAN node 111 will provide an identifier of a RAN endpoint address to be used, selected by the RAN node 111.

(c) In case the core network node 130 only provide a recommended CN transport endpoint to the RAN node 111, and the RAN node 111 cannot find a suitable RAN endpoint, the RAN node 111 may respond with a reject signal, indicating that a re-negotiation is needed. In this reject signal the RAN node 111 may also provide to the core network node 130 any one out of:

- Identifiers for all available RAN endpoint such as addresses, and
- identifiers for a recommended RAN endpoint address for each EPS bearer also referred to as E-RAB to be set up for the upcoming user plane session.

After the reject signal is received, the core network node 130 may restart the sub-actions (a) and (b) for the next round of negotiation.

EXAMPLES ON REALIZATION

Two use examples will be described below. However, it should be noted that the examples below are applicable to and may be combined with each other and any suitable embodiment described above.

Example 1

In this example a new identifier is used a for each virtualized instance. The characteristics of the respective transport path of the number of possible CN/RAN endpoint pairs may in this example e.g. be represented by area identity or data center identity. Here LTE and EPC is used as an example. This relates to the embodiment depicted in FIG. 11a.

In this example, the following variant of the actions described above is used:

- The identification of available CN endpoints and available RAN endpoints are performed by automatic determination.
- The Characteristics obtaining and/or determining are performed by autonomous by identity matching, and distributed during runtime.
- The endpoint CN/RAN pair is decided by negotiation between the core network node 130 and the RAN node 111.

Figure 13:
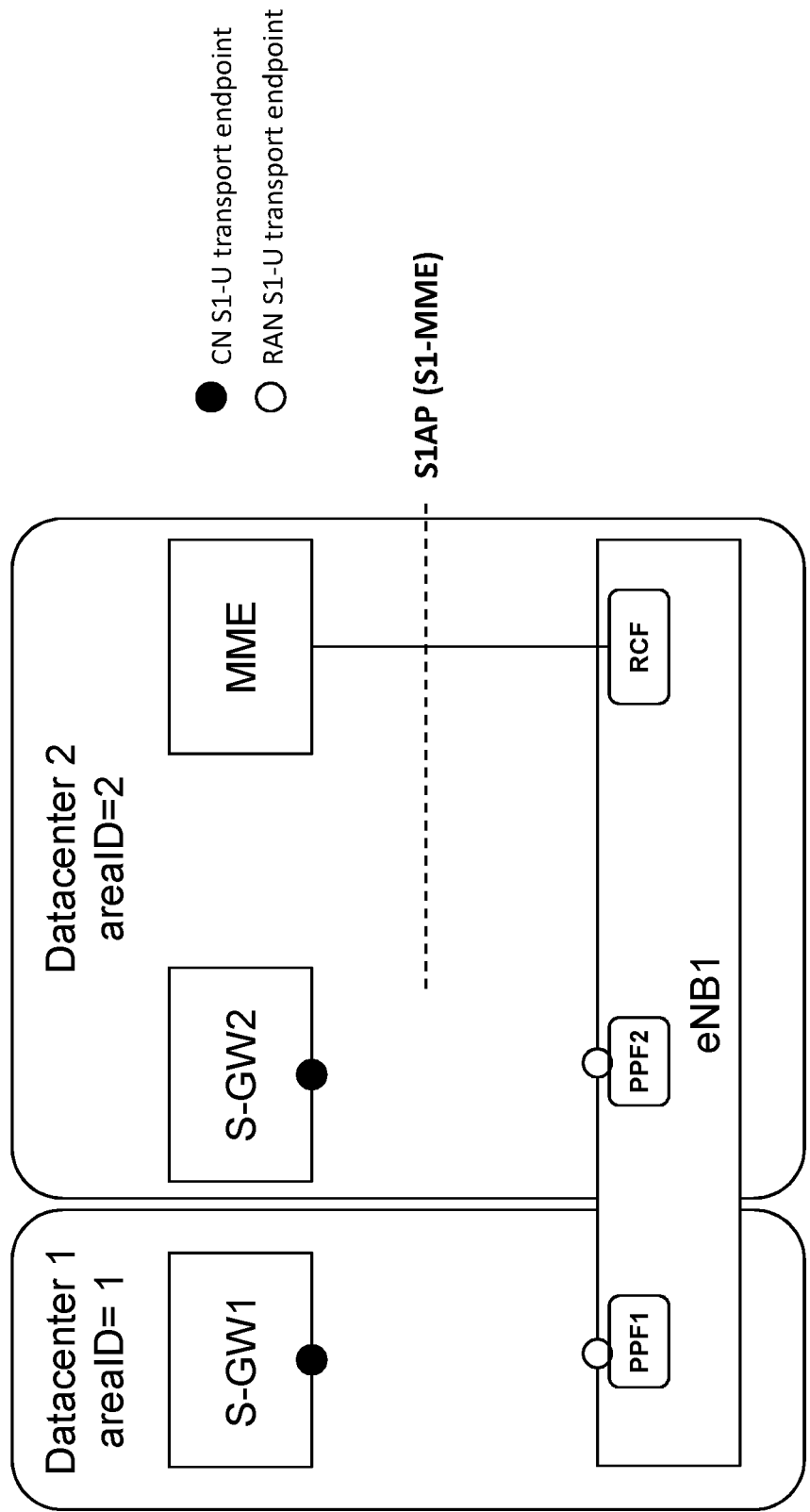
FIG. 13 is a schematic block diagram illustrating embodiments of a radio communications network.

The topology of example 1 is shown in FIG. 13. The first gateway node 141 is represented by a serving gateway referred to as S-GW 1 and the second gateway node 142 is represented by a serving gateway referred to as S-GW 2. Further, the network node 111 is represented by an eNB, referred to as eNB1. Thus in this LTE/EPC network there are two serving gateways, S-GW1, S-GW2, and one eNB, eNB1. S-GW1 has one CN endpoint for user plane and S-GW2 has one CN transport endpoint for user plane. The CN endpoints are referred to as filled circles in FIG. 13. The eNB1 has two RAN endpoints. The RAN transport endpoints for user plane are referred to as filled circles in FIG. 13. The core network node 130 is represented by an MME in the example depicted in FIG. 13.

Between eNB1 and S-GW1, as there are two CN transport endpoints and two RAN endpoints, there will be four possible CN/RAN endpoint pairs for setting up a S1-U tunnel.

In the example according to embodiments herein and in FIG. 12, there is also a database (DB) function, which will be used in some of the embodiments for storing CN transport endpoints and/or RAN transport endpoints, and the characteristics of the available and/or recommended and/or decided CN/RAN endpoint pairs. An RCF is in this example included in the eNB1.

When Virtualized Machines (VMs) are created, e.g. the S-GWs and the PPFs, the O&M system knows where the VMs are created. I.e. it is known which datacenters that are used. A Virtualized Machine is an application environment that is installed on software, which imitates dedicated hardware. The application (in this case S-GWs/PPFs) has the same experience on a virtual machine as they would have on dedicated hardware.

The O&M system in the network includes in a Virtual Network Function (VNF) descriptor an identifier that should be read into the VNF at instantiation. This identifier would be different for each datacenter used, it may for example be based on area, e.g. AreaId.

When the VMs start up, they incorporate the AreaId in its data. To exemplify, the PPF1 and S-GW1 are related to the same Datacenter 1 and both incorporate AreaId=1 referred to as AreaId1 in FIG. 13. PPF2 and S-GW2 are related to the same Datacenter 2 and both PPF2 and S-GW2 incorporate AreaId=2 referred to as AreaId2 in FIG. 13.

At initial attach or service request procedure between UE 120, eNB1 and the core network 200, e.g. LTE, in S1AP Initial UE Message from eNB1 to MME, the eNB1 may include a prioritized list of preferred AreaId's together with optional latency and optional bandwidth estimates for each AreaId indicating the characteristics that RAN 102 such as the eNB1 which it can fulfill if PPF if this AreaId is chosen. The eNB1/RCF know which PPFs it has available and can use, since when the PPFs where started up they connected to the RCF and they also included their AreaIds. The eNB1/RCF also knows what characteristics is can obtain between its internal functions.

At bearer establishment, the MME selects an S-GW in its standard way, e.g. based on for example Tracking Area where the UE 120 is located, assume that S-GW 1 is selected in this example. The MME also considers the prioritized list provided by the eNB1, and signals to the selected S-GW1 to allocate resources. In the reply to the MME the S-GW1 includes the IP address where the selected resources are available and the S-GW1 also includes the AreaId, e.g. if S-GW1 was selected, AreaId1 would be sent to the MME.

The MME then needs to select resources in the eNB1, in a split RAN architecture the instance that handles this is called RCF. The MME sends a request to the eNB1/RCF and includes the S-GW1 IP address and the AreaId1.

Here the characteristics of the respective transport path of the number of possible CN/RAN endpoint pairs is represented by the AreaId1 and AreaId2. The eNB1/RCF looks at the AreaId it received from the MME, checks its data about the available PPFs related to its RAN endpoints, and discovers that PPF1 has indicated the same AreaId as the AreaId in the request received from the MME. The eNB1 thus selects PPF1 for this user plane session between the RAN 102 and a the CN 104.

Resources in PPF1 is selected by the eNB/RCF, and the eNB/RCF replies to the MME which thereby has obtained the decision. The MME further informs the S-GW1 about PPF1 IP address.

A user plane session is established between PPF1 and S-GW1 in the same Datacenter1.

If the eNB instead notice that due to some reason PPF1 is not suitable for this session and wants to establish the session with AreaId2, then eNB/RCF replies to the MME with setup reject signal, e.g. including reason for reject also referred to as re-negotiation, and a new prioritized AreaId list indicating AreaID (=2) as first choice. After this rejection the MME will repeat to select an S-GW until the session is established or reject the session setup if there are too many setup attempts. Alternatively the session can be allowed to be established with non-optimal performance.

Example 2

Figure 14:
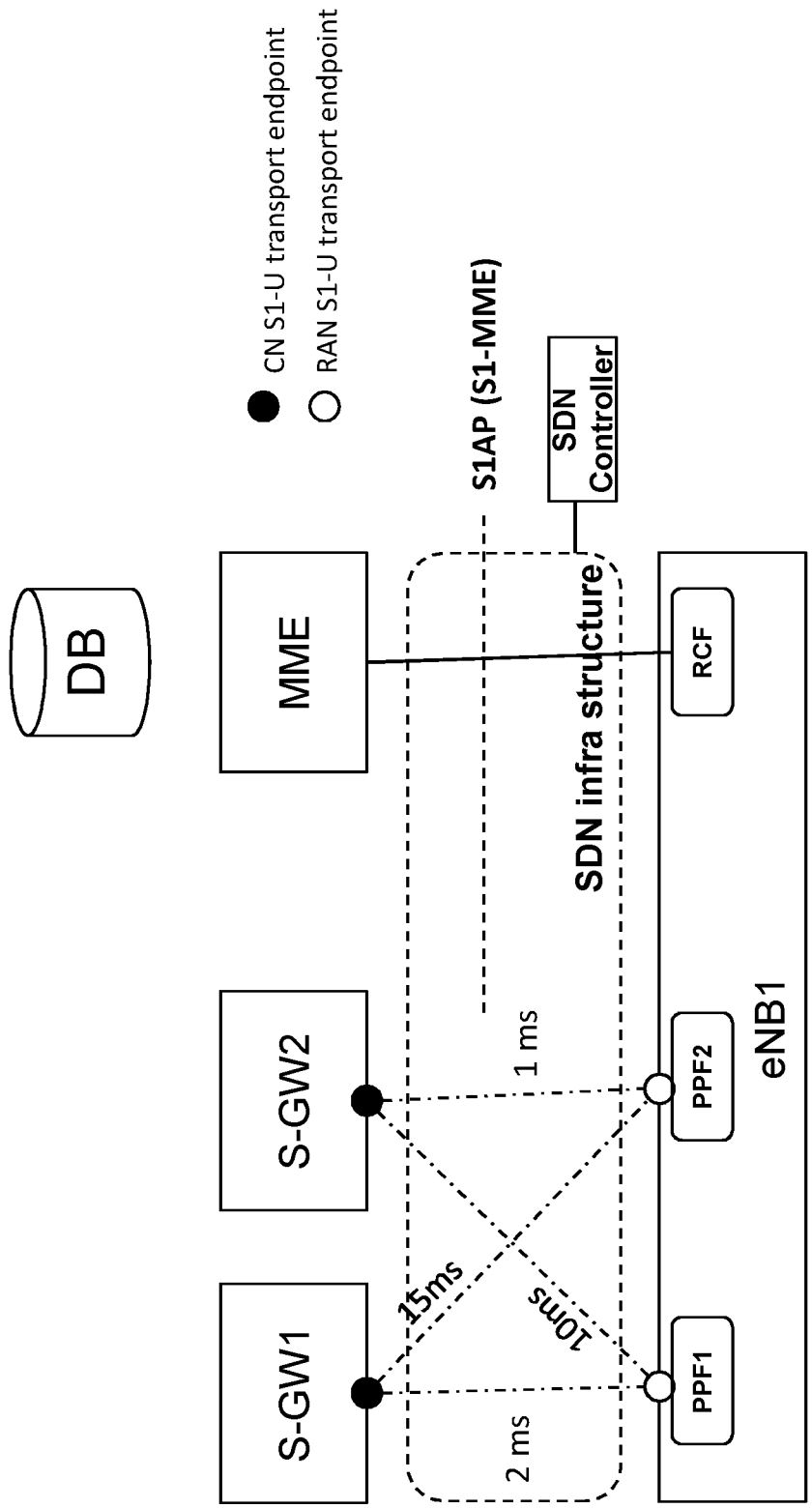
FIG. 14 is a schematic block diagram illustrating embodiments of a radio communications network.

In this example measurements for optimizing the S1-U setup are used. The topology of example 2 is shown in FIG. 14. This embodiment may relate to the embodiment depicted in FIG. 11b. In this example, the transport network between the CN 104 and the RAN 102 is of type Software Defined Network (SDN) infra structure, and is controlled by a SDN controller instance.

The first gateway node 141 is represented by a serving gateway referred to as S-GW 1 and the second gateway node 142 is represented by a serving gateway referred to as S-GW 2. Further, the network node 111 is represented by an eNB, referred to as eNB1. Thus in this LTE/EPC network there are two serving gateways, S-GW1, S-GW2, and one eNB, eNB1. S-GW1 has one CN endpoint for user plane and S-GW2 has one CN transport endpoint for user plane. The CN endpoints are referred to as filled circles in FIG. 14. The eNB1 has two RAN endpoints. The RAN transport endpoints for user plane are referred to as filled circles in FIG. 14. The core network node 130 is represented by an MME in the example in FIG. 14.

Between eNB1 and S-GW1, as there are two CN transport endpoints and two RAN endpoints, there will be four possible CN/RAN endpoint pairs for setting up a S1-U tunnel.

In the example according to embodiments herein and in FIG. 14, there is also a database (DB) function, which will be used in some of the embodiments for storing CN transport endpoints and/or RAN transport endpoints, and the characteristics of the available and/or recommended and/or decided CN/RAN endpoint pairs. An RCF is in this example included in the eNB1 and is referred to as eNB1/RCF.

In the example 2, the following variant of the actions described above is used:

The identification of available transport endpoints is performed by static configuration, in a distributed approach.

The characteristics obtaining and/or determining are performed by autonomous determination by measurements on delay only.

The endpoint CN/RAN pair is decided by the core network node 130.

The S-GW1 and the SGW-2 are initiated, their CN endpoints will be registered to the DB. The registering may be performed by the respective S-GW. The DB is illustrated as a standalone entity, it may also be part of the MME.

The eNB1 is initiated, MME obtains e.g. by fetching the available CN transport endpoints from the DB and informs the eNB1 by sending identifiers of the available CN transport endpoints during S1 Setup procedure with the new IE. The eNB1 also informs the MME about its RAN transport endpoints by sending its identifiers during the S1 Setup procedure. The MME will then store the identifiers of the RAN endpoints for the eNB1 in the DB. The S-GW1 and The S-GW2 will also be informed the new eNB1 and its RAN endpoints and respective identifiers.

The S-GW1, the S-GW2, and the eNB1 execute delay measurement on all possible endpoint CN/RAN pairs by execute a test procedure, e.g. using intelligent estimation done by the SDN infrastructure, or similar procedure periodically. Intelligent estimation is an estimation method for measuring two-way delay between two end-points in IP-network. The results of the delay of all possible endpoint CN/RAN pairs in this example depicted in FIG. 14 comprises:

Delay in S-GW1-PPF1=2 milliseconds (ms)
Delay in S-GW1-PPF2=15 ms
Delay in S-GW2-PPF1=10 ms
Delay in S-GW2-PPF2=1 ms This test procedure may be triggered by the S-GW1, the S-GW2, and the eNB1 themselves when becoming aware of each other's transport endpoints, or by the MME, or by the O&M. The measurement results will be sent to the DB. For the eNB1 the result may e.g. be sent through the MME using S1AP eNB update procedure with new IE:s. If MMEs operating in pool and each MME has its own DB, the controller of the test needs to coordinate that only one test is executing and that the test results are distributed to all MMEs in the pool.

At bearer establishment between eNB1 and the CN 104, the MME will obtain e.g. by selecting the most suitable CN/RAN endpoint pairs, based on the delay measurement information stored in the DB. In this case, the S-GW2 and the PPF2 in the eNB1 will be selected. The MME signals to the S-GW2 to allocate resources with additional information on the selected CN endpoint.

The MME then needs to select resources in the eNB1. The MME sends a request to the eNB1/RCF and includes both an identifier of the CN endpoint of the S-GW2 and the identifier of the RAN endpoint of the PPF2 according to the obtained CN/RAN endpoint pair.

The eNB1 will select resources in PPF2, and eNB1/RCF replies to the MME informing about the selected resources, and MME further informs the S-GW2 about the PPF2 IP address which is the RAN endpoint identifier.

A user plane session is established between the RAN endpoint in the PPF2 and the CN endpoint in the S-GW2 selected with the best delay performance.

Figure 15:
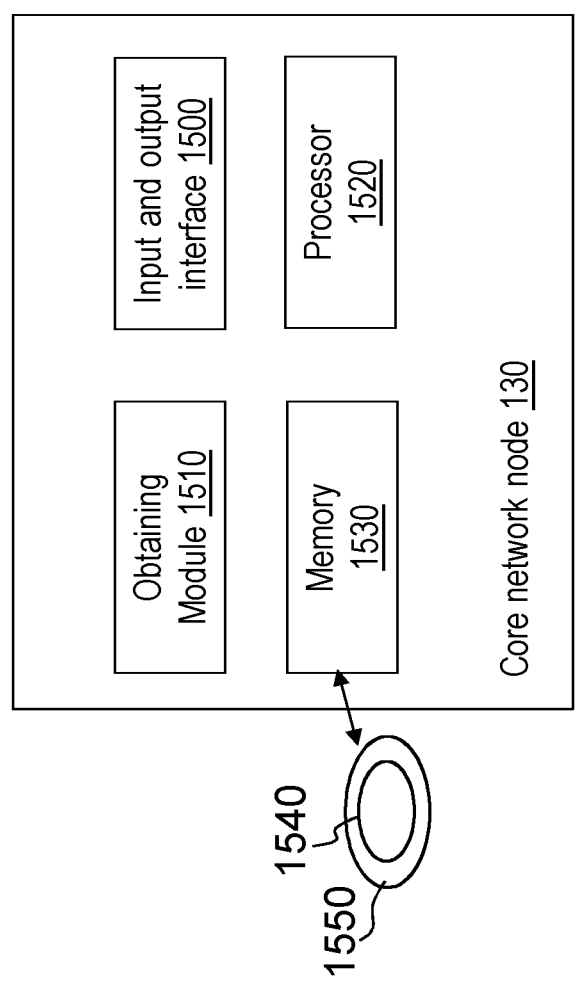
FIG. 15 is a schematic block diagram illustrating embodiments of a core network node.

To perform the method actions for obtaining a decision of the CN/RAN transport endpoint pair for a user plane session between the RAN 102 and a CN 104 in the radio communications network 100, the core network node 130 may comprise the following arrangement depicted in FIG. 15. The RAN 102 is arranged to comprise multiple RAN transport endpoints, referred to as RAN endpoints, 1111, 1112, and the CN 104 is arranged to comprise multiple CN transport endpoints, CN endpoints, 1411, 1412, 1421.

The available CN endpoints 1411, 1412, 1421 may be adapted to be comprised in one or more gateways 141, 142 operating in the CN 104, and the available RAN endpoints 1111, 1112 may be adapted to be comprised in one or more RAN node nodes 111 operating in the RAN 102.

The core network node 130 comprises an input and output interface 1500 configured to communicate, with one or more network nodes such as core network nodes, e.g. the first and/or second gateway node 141, 142, RAN nodes such as the RAN node 111, and/or O&M nodes. The input and output interface 1300 may comprise a receiver (not shown) and a transmitter (not shown).

The core network node 130 is configured to, e.g. by means of an obtaining module 1510 configured to, obtain identifiers of available CN endpoints 1411, 1412, 1421 in the CN 104, and obtain identifiers of available RAN endpoints 1111, 1112 in the RAN 102. The available CN endpoints 1411, 1412, 1421 and available RAN endpoints 1111, 1112 are adapted to comprise a number of possible transport endpoint pairs between the RAN 102 and the CN 104 CN/RAN endpoint pairs.

The core network node 130 is further configured to, e.g. by means of the obtaining module 1510 configured to, obtain characteristics of a respective transport path of the number of possible CN/RAN endpoint pairs.

The core network node 130 is further configured to, e.g. by means of the obtaining module 1510 configured to, obtain a decision of a CN/RAN endpoint pair out of the number of possible CN/RAN endpoint pairs, based on the obtained characteristics of the respective transport path of the number of possible CN/RAN endpoint pairs. The CN/RAN endpoint pair is selected to be used for the user plane session between the RAN 102 and the CN 104 in the radio communications network 100.

In some embodiments, the core network node 130 is further configured to, e.g. by means of the obtaining module 1510 configured to, obtain the decision of a CN/RAN endpoint pair by basing it on a negotiation with the RAN 102 comprising to:

Send a request associated with the user plane session to a RAN node 111 comprising the RAN endpoints 1111, 1112, which request is adapted to comprise identifiers to all available CN endpoints 1411, 1412, 1421 for the user plane session between the RAN 102 and the CN 104, and receive from the RAN node 111, a response to the sent request, which response is adapted to comprise identifiers of one or more recommended CN/RAN endpoint pairs based on the identifiers to all available CN endpoints 1411, 1412, 1421 in the sent request.

In some alternative embodiments, the core network node 130 is further configured to, e.g. by means of the obtaining module 1510 configured to, obtain the decision of the CN/RAN endpoint pair by basing it on a negotiation with the RAN 102 comprising to:

Send a request associated with the user plane session to a RAN node 111 comprising the RAN endpoints 1111, 1112, which request is adapted to comprise one or more identifiers to a recommended CN endpoint 1411, 1412, 1421 for the user plane session between the RAN 102 and the CN 104, and receive from the RAN node 111, a response to the sent request, which response is adapted to comprise an identifier to a RAN endpoint 1111, 1112 based on the identifiers to a recommended CN endpoint 1411, 1412, 1421 in the sent request.

The core network node 130 may further be configured to, e.g. by means of the obtaining module 1510 configured to, obtain the identifiers of available CN endpoints 1411, 1412, 1421 and RAN endpoints 1111, 1112, by a static configuration, wherein the identifiers of the available CN endpoints 1411, 1412, 1421 and RAN endpoints 1111, 1112 are adapted to be distributed during initialization of CN nodes 141, 142, and RAN nodes, and/or directly after changes has been done on the available CN endpoints 1411, 1412, 1421 and RAN endpoints 1111, 1112.

The core network node 130 may further be configured to, e.g. by means of the obtaining module 1510 configured to, obtain the identifiers of available CN endpoints 1411, 1412, 1421 and RAN endpoints 1111, 1112, by the static configuration in any one or more out of:

A centralized configuration, wherein identifiers of the available CN endpoints 1411, 1412, 1421 and RAN endpoints 1111, 1112 are adapted to be stored in a database 150 accessible both from RAN nodes and from CN nodes including the core network node 130, and a distributed configuration, wherein the available CN endpoints 1411, 1412, 1421 and RAN endpoints 1111, 1112 are adapted to be dynamically distributed between CN nodes including the core network node 130 and RAN nodes related to each other.

The core network node 130 may further be configured to, e.g. by means of the obtaining module 1510 configured to, obtain the identifiers of the available CN endpoints 1411, 1412, 1421 and RAN endpoints 1111, 1112 in an autonomous configuration. The identifiers of the available CN endpoints 1411, 1412, 1421 and RAN endpoints 1111, 1112 are to be distributed first when a user plane tunnel is needed to be setup or modified for the user plane session between the decided CN/RAN endpoint pair In some embodiments, the core network node 130 is configured to, e.g. by means of the obtaining module 1510 configured to, obtain the decision of a CN/RAN endpoint pair by deciding the CN/RAN endpoint pair.

The core network node 130 may further be configured to, e.g. by means of the obtaining module 1510 configured to, obtain the characteristics of the respective transport path of the number of possible CN/RAN endpoint pairs, in any one out of a static configuration and an autonomous configuration.

In the static configuration, the characteristics are adapted to be stored in a data base 150 when a new available CN endpoint 1411, 1412, 1421 and/or RAN endpoint 1111, 1112 is introduced.

In the autonomous configuration, the characteristics are adapted to be obtained by (a) obtaining measurements of the respective transport path of the number of possible CN/RAN endpoint pairs, and/or (b) matching identities related to the characteristics of the respective available CN endpoints 1411, 1412, 1421 and/or RAN endpoints 1111, 1112.

The embodiments herein for obtaining a decision of the CN/RAN transport endpoint pair for a user plane session between the RAN 102 and a CN 104 in the radio communications network 100, the core network node 130 may be implemented through one or more processors, such as a processor 1520 of a processing circuitry in the core network node 130 depicted in FIG. 15, together with computer program code for performing the functions and actions of the embodiments herein. The program code mentioned above may also be provided as a computer program product, for instance in the form of a data carrier carrying computer program code for performing the embodiments herein when being loaded into the core network node 130. One such carrier may be in the form of a CD ROM disc. It is however feasible with other data carriers such as a memory stick. The computer program code may furthermore be provided as pure program code on a server and downloaded to the core network node 130.

The core network node 130 may further comprise a memory 1530 comprising one or more memory units. The memory 1530 comprises instructions executable by the processor 1520.

The memory 1530 is arranged to be used to store e.g. identifiers of any one or more out of: the available CN endpoints 1411, 1412, 1421, available RAN endpoints 1111, 1112 CN/RAN endpoint pairs, configuration information, feedback, data, and applications to perform the methods herein when being executed in the core network node 130.

In some embodiments, a computer program 1540 comprises instructions, which when executed by the at least one processor 1540, cause the at least one processor 1540 to perform actions according to any of the Actions 1101-1108.

In some embodiments, a carrier 1550 comprises the computer program 1540, wherein the carrier is one of an electronic signal, an optical signal, an electromagnetic signal, a magnetic signal, an electric signal, a radio signal, a microwave signal, or a computer-readable storage medium.

Those skilled in the art will also appreciate that the modules in the core network node 130, described above may refer to a combination of analog and digital circuits, and/or one or more processors configured with software and/or firmware, e.g. stored in the memory 1530, that when executed by the one or more processors such as the processor 1520 as described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

The invention claimed is:

1. A method performed by a core network node for obtaining a decision of a Core Network, CN/Radio Access Network, RAN, endpoint pair for a user plane session between a RAN, and a CN in a radio communications network, the RAN comprises multiple RAN transport endpoints, RAN endpoints, and the CN comprises multiple CN transport endpoints, CN endpoints, the method comprising:
    obtaining identifiers of available CN endpoints in the CN, and obtaining identifiers of available RAN endpoints in the RAN, which available CN endpoints and available RAN endpoints comprises a number of possible transport endpoint pairs between the RAN and the CN, CN/RAN endpoint pairs;
    obtaining characteristics of a respective transport path of the number of possible CN/RAN endpoint pairs; and
    obtaining a decision of a CN/RAN endpoint pair out of the number of possible CN/RAN endpoint pairs, based on the obtained characteristics of the respective transport path of the number of possible CN/RAN endpoint pairs, which CN/RAN endpoint pair is selected for the user plane session between the RAN and the CN in the radio communications network.

2. A non-transitory computer-readable storage medium, having stored thereon a computer program comprising instructions, which when executed by a processor, causes the processor to perform actions according to any of the claim 1.

3. A core network node arranged to obtain a decision of a Core Network, CN/Radio Access Network, RAN, transport endpoint pair for a user plane session between a RAN and a CN in a radio communications network, the RAN is arranged to comprise multiple RAN transport endpoints, RAN endpoints, and the CN is arranged to comprise multiple CN transport endpoints, CN endpoints, the core network node comprising a processor and memory, said memory containing instructions executable by said processor whereby said core network node is operative to:
    obtain identifiers of available CN endpoints in the CN, and obtain identifiers of available RAN endpoints in the RAN, which available CN endpoints and available RAN endpoints are adapted to comprise a number of possible transport endpoint pairs between the RAN and the CN, CN/RAN endpoint pairs;
    obtain characteristics of a respective transport path of the number of possible CN/RAN endpoint pairs; and
    obtain a decision of a CN/RAN endpoint pair out of the number of possible CN/RAN endpoint pairs, based on the obtained characteristics of the respective transport path of the number of possible CN/RAN endpoint pairs, which CN/RAN endpoint pair is selected to be used for the user plane session between the RAN and the CN in the radio communications network.

4. The core network node according to claim 3, wherein the available CN endpoints are adapted to be comprised in one or more gateways operating in the CN, and the available RAN endpoints are adapted to be comprised in one or more RAN nodes operating in the RAN.

5. The core network node according to claim 3, wherein the core network node is further configured to obtain the decision of the CN/RAN endpoint pair by basing it on a negotiation with the RAN comprising to:
    send a request associated with the user plane session to a RAN node comprising the RAN endpoints, which request is adapted to comprise identifiers to all available CN endpoints for the user plane session between the RAN and the CN; and
    receive from the RAN node, a response to the sent request, which response is adapted to comprise identifiers of one or more recommended CN/RAN endpoint pairs based on the identifiers to all available CN endpoints in the sent request.

6. The core network node according to claim 3, wherein the core network node is further configured to obtain the decision of the CN/RAN endpoint pair by basing it on a negotiation with the RAN comprising to:
    send a request associated with the user plane session to a RAN node comprising the RAN endpoints, which request is adapted to comprise one or more identifiers to a recommended CN endpoint for the user plane session between the RAN and the CN; and
    receive from the RAN node, a response to the sent request, which response is adapted to comprise an identifier to a RAN endpoint based on the identifiers to a recommended CN endpoint in the sent request.

7. The core network node according to claim 3, wherein core network node is configured to obtain the decision of a CN/RAN endpoint pair by deciding the CN/RAN endpoint pair.

8. The core network node according to claim 3, wherein the core network node is further configured to obtain the identifiers of available CN endpoints and RAN endpoints, by a static configuration, wherein the identifiers of the available CN endpoints and RAN endpoints are adapted to be distributed during initialization of CN nodes, and RAN nodes, and/or directly after changes has been done on the available CN endpoints and RAN endpoints.

9. The core network node according to claim 8, wherein the core network node is further configured to obtain the identifiers of available CN endpoints and RAN endpoints, by the static configuration in any one or more out of:
    a centralized configuration, wherein identifiers of the available CN endpoints and RAN endpoints are adapted to be stored in a database accessible both from RAN nodes and from CN nodes including the core network node; and
    a distributed configuration, wherein the available CN endpoints and RAN endpoints are adapted to be dynamically distributed between CN nodes including the core network node and RAN nodes related to each other.

10. The core network node according to claim 3, wherein the core network node is further configured to obtain the identifiers of the available CN endpoints and RAN endpoints in an autonomous configuration, wherein identifiers of the available CN endpoints and RAN endpoints are to be distributed first when a user plane tunnel is needed to be setup or modified for the user plane session between the decided CN/RAN endpoint pair.

11. The core network node according to claim 3, wherein the core network node is further configured to obtain the characteristics of the respective transport path of the number of possible CN/RAN endpoint pairs, in any one out of:
- a static configuration, wherein the characteristics are adapted to be stored in a data base when a new available CN endpoint and/or RAN endpoint is introduced, and
- an autonomous configuration, wherein the characteristics are adapted to be obtained by
    - (a) obtaining measurements of the respective transport path of the number of possible CN/RAN endpoint pairs, and/or
    - (b) matching identities related to the characteristics of the respective available CN endpoints and/or RAN endpoints.

* * * * *